(12) United States Patent
Nelson et al.

(10) Patent No.: US 11,017,741 B2
(45) Date of Patent: May 25, 2021

(54) LIGHT SENSOR HAVING PARTIALLY OPAQUE OPTIC

(71) Applicant: Gentex Corporation, Zeeland, MI (US)

(72) Inventors: Barry K. Nelson, Howard City, MI (US); Jon H. Bechtel, Holland, MI (US); Daniel G. McMillan, Zeeland, MI (US); Spencer D. Reese, Auburn, IN (US)

(73) Assignee: GENTEX CORPORATION, Zeeland, MI (US)

( * ) Notice: Subject to any disclaimer, the term of this patent is extended or adjusted under 35 U.S.C. 154(b) by 346 days.

(21) Appl. No.: 15/869,556

(22) Filed: Jan. 12, 2018

(65) Prior Publication Data

US 2018/0158435 A1 Jun. 7, 2018

Related U.S. Application Data

(60) Division of application No. 14/341,933, filed on Jul. 28, 2014, now Pat. No. 9,870,753, which is a
(Continued)

(51) Int. Cl.
*G09G 5/10* (2006.01)
*B60R 1/08* (2006.01)
(Continued)

(52) U.S. Cl.
CPC .............. *G09G 5/10* (2013.01); *B60R 1/088* (2013.01); *G01J 1/26* (2013.01); *G01J 1/4228* (2013.01);
(Continued)

(58) Field of Classification Search
CPC .............. G02F 1/133; B60R 1/02; B60R 1/12
(Continued)

(56) References Cited

U.S. PATENT DOCUMENTS

| 2,632,040 A | 3/1953 | Rabinow |
| 2,762,930 A | 9/1956 | Onksen, Jr. et al. |

(Continued)

FOREIGN PATENT DOCUMENTS

| CN | 1902522 | 1/2007 |
| CN | 101738812 | 6/2010 |

(Continued)

OTHER PUBLICATIONS

J.P. Lowenau et al., Adaptive Light Control—a New Light Concept Controlled by Vehicle Dynamics and Navigation, SAE Paper No. 980007, Feb. 23, 1998, pp. 33-38.
(Continued)

*Primary Examiner* — Kevin K Pyo
(74) *Attorney, Agent, or Firm* — Price Heneveld LLP; Bradley D. Johnson

(57) ABSTRACT

A rearview assembly for a vehicle is provided that includes: a housing configured for mounting to the vehicle; a rearview element disposed in the housing that displays images of a scene exterior of the vehicle; a light sensor assembly disposed in the housing; and a controller for receiving the electrical signal of the light sensor and for adjusting a brightness of the images displayed by the rearview element. The light sensor includes a light sensor for outputting an electrical signal representing intensity of light impinging upon a light-receiving surface of the light sensor, and a secondary optical element configured to receive light, wherein the light passes through the secondary optical element to the light sensor, the secondary optical element including a tint material that is substantially color neutral for attenuating light passing therethrough.

15 Claims, 13 Drawing Sheets

Related U.S. Application Data continuation-in-part of application No. 13/764,971, filed on Feb. 12, 2013, now Pat. No. 9,207,116.

(60) Provisional application No. 61/858,820, filed on Jul. 26, 2013.

(51) Int. Cl.
  *G01J 1/26* (2006.01)
  *G01J 1/46* (2006.01)
  *G01J 1/42* (2006.01)
  *G01J 1/02* (2006.01)

(52) U.S. Cl.
  CPC ......... *G01J 1/46* (2013.01); *G01J 2001/0276* (2013.01); *G09G 2320/0626* (2013.01); *G09G 2380/10* (2013.01)

(58) Field of Classification Search
  USPC .................. 250/221, 214 R, 214 C, 214 AL; 359/602, 609; 340/815.4, 901
  See application file for complete search history.

(56) References Cited

U.S. PATENT DOCUMENTS

| | | |
|---|---|---|
| 2,827,594 A | 3/1958 | Rabinow |
| 3,260,849 A | 7/1966 | Polye |
| 3,601,614 A | 8/1971 | Platzer, Jr. |
| 3,680,951 A | 8/1972 | Jordan et al. |
| 3,711,722 A | 1/1973 | Kavanagh |
| 3,746,430 A | 7/1973 | Brean et al. |
| 3,749,477 A | 7/1973 | Willoughby et al. |
| 3,828,220 A | 8/1974 | Moore et al. |
| 3,866,067 A | 2/1975 | Amelio |
| 3,914,309 A | 10/1975 | Swensen |
| 4,023,368 A | 5/1977 | Kelly |
| 4,140,142 A | 2/1979 | Dormidontov et al. |
| 4,161,653 A | 7/1979 | Bedini et al. |
| 4,208,668 A | 6/1980 | Krimmel |
| 4,225,782 A | 9/1980 | Kuppenheimer et al. |
| 4,293,877 A | 10/1981 | Tsunekawa et al. |
| 4,315,159 A | 2/1982 | Niwa et al. |
| 4,355,271 A | 10/1982 | Noack |
| 4,443,057 A | 4/1984 | Bauer et al. |
| 4,465,370 A | 8/1984 | Yuasa et al. |
| 4,469,417 A | 9/1984 | Masunaga et al. |
| 4,475,036 A | 10/1984 | Bauer et al. |
| 4,547,676 A | 10/1985 | Suzuki et al. |
| 4,580,875 A | 4/1986 | Bechtel et al. |
| 4,603,946 A | 8/1986 | Kato et al. |
| 4,620,141 A | 10/1986 | McCumber et al. |
| 4,632,509 A | 12/1986 | Ohmi et al. |
| 4,652,745 A | 3/1987 | Zanardelli |
| 4,669,826 A | 6/1987 | Itoh et al. |
| 4,678,938 A | 7/1987 | Nakamura |
| 4,684,222 A | 8/1987 | Borrelli et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,770,514 A | 9/1988 | Silverglate |
| 4,793,690 A | 12/1988 | Gahan et al. |
| 4,798,956 A | 1/1989 | Hochstein |
| 4,799,768 A | 1/1989 | Gahan |
| 4,819,071 A | 4/1989 | Nakamura |
| 4,859,867 A | 8/1989 | Larson et al. |
| 4,862,037 A | 8/1989 | Farber et al. |
| 4,867,561 A | 9/1989 | Fuji et al. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,902,108 A | 2/1990 | Byker |
| 4,916,307 A | 4/1990 | Nishibe et al. |
| 4,916,374 A | 4/1990 | Schierbeek et al. |
| 4,917,477 A | 4/1990 | Bechtel et al. |
| 4,930,742 A | 6/1990 | Schofield et al. |
| 4,956,591 A | 9/1990 | Schierbeek et al. |
| 4,960,996 A | 10/1990 | Hochstein |
| 4,967,319 A | 10/1990 | Seko |
| 4,973,844 A | 11/1990 | O'Farrell et al. |
| 4,987,354 A | 1/1991 | Steinmann |
| 5,036,437 A | 7/1991 | Macks |
| 5,105,207 A | 4/1992 | Nelson |
| 5,124,549 A | 6/1992 | Michaels et al. |
| 5,140,455 A | 8/1992 | Varaprasad et al. |
| 5,160,971 A | 11/1992 | Koshizawa |
| 5,172,206 A | 12/1992 | Iizuka |
| 5,204,778 A | 4/1993 | Bechtel |
| 5,214,274 A | 5/1993 | Yang |
| 5,214,275 A | 5/1993 | Freeman et al. |
| 5,220,317 A | 6/1993 | Lynam et al. |
| 5,235,178 A | 8/1993 | Hegyi |
| 5,243,215 A | 9/1993 | Enomoto et al. |
| 5,276,389 A | 1/1994 | Levers |
| 5,306,992 A | 4/1994 | Droge |
| 5,313,072 A | 5/1994 | Vachss |
| 5,329,206 A | 7/1994 | Slotkowski et al. |
| 5,336,980 A | 8/1994 | Levers |
| 5,338,691 A | 8/1994 | Enomoto et al. |
| 5,386,111 A | 1/1995 | Zimmerman |
| 5,386,128 A | 1/1995 | Fossum et al. |
| 5,400,072 A | 3/1995 | Izumi et al. |
| 5,410,455 A | 4/1995 | Hashimoto |
| 5,416,313 A | 5/1995 | Larson et al. |
| 5,416,318 A | 5/1995 | Hegyi |
| 5,426,294 A | 6/1995 | Kobayashi et al. |
| 5,434,407 A | 7/1995 | Bauer et al. |
| 5,451,822 A | 9/1995 | Bechtel et al. |
| 5,471,515 A | 11/1995 | Fossum |
| 5,483,346 A | 1/1996 | Butzer |
| 5,488,416 A | 1/1996 | Kyuma |
| 5,498,866 A | 3/1996 | Bendicks et al. |
| 5,508,592 A | 4/1996 | Lapatovich et al. |
| 5,526,190 A | 6/1996 | Hubble, III et al. |
| 5,537,003 A | 7/1996 | Bechtel et al. |
| 5,550,677 A | 8/1996 | Schofield et al. |
| 5,561,773 A | 10/1996 | Kalish et al. |
| 5,581,240 A | 12/1996 | Egger |
| 5,598,146 A | 1/1997 | Schroder |
| 5,602,384 A | 2/1997 | Nunogaki et al. |
| 5,614,788 A | 3/1997 | Mullins et al. |
| 5,625,210 A | 4/1997 | Lee et al. |
| 5,644,418 A | 7/1997 | Woodward |
| 5,650,643 A | 7/1997 | Konuma |
| 5,659,294 A | 8/1997 | Schroder |
| 5,659,423 A | 8/1997 | Schierbeek et al. |
| 5,660,454 A | 8/1997 | Mori et al. |
| 5,661,303 A | 8/1997 | Teder |
| 5,663,542 A | 9/1997 | Kohr et al. |
| 5,666,028 A | 9/1997 | Bechtel et al. |
| 5,666,037 A | 9/1997 | Reime |
| 5,675,438 A | 10/1997 | Nagao et al. |
| 5,677,526 A | 10/1997 | Hattori |
| 5,703,568 A | 12/1997 | Hegyi |
| 5,712,685 A | 1/1998 | Dumas |
| 5,715,093 A | 2/1998 | Schierbeek et al. |
| 5,724,187 A | 3/1998 | Varaprasad et al. |
| RE35,762 E | 4/1998 | Zimmerman |
| 5,743,946 A | 4/1998 | Aoki et al. |
| 5,789,737 A | 4/1998 | Street |
| 5,760,962 A | 6/1998 | Schofield et al. |
| 5,767,718 A | 6/1998 | Shih |
| 5,796,094 A | 8/1998 | Schofield et al. |
| 5,796,106 A | 8/1998 | Noack |
| 5,808,350 A | 9/1998 | Jack et al. |
| 5,811,793 A | 9/1998 | Pientka |
| 5,818,600 A | 10/1998 | Bendicks et al. |
| 5,821,863 A | 10/1998 | Schroder et al. |
| 5,837,994 A | 11/1998 | Stam et al. |
| 5,841,126 A | 11/1998 | Fossum et al. |
| 5,841,159 A | 11/1998 | Lee et al. |
| 5,841,177 A | 11/1998 | Komoto et al. |
| 5,844,682 A | 12/1998 | Kiyomoto et al. |

(56) References Cited

U.S. PATENT DOCUMENTS

| | | |
|---|---|---|
| 5,869,883 A | 2/1999 | Mehringer et al. |
| 5,872,437 A | 2/1999 | Pientka et al. |
| 5,877,897 A | 3/1999 | Schofield et al. |
| 5,883,605 A | 3/1999 | Knapp |
| 5,904,493 A | 5/1999 | Lee et al. |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,027,955 A | 2/2000 | Lee et al. |
| 6,037,824 A | 3/2000 | Takahashi |
| 6,069,378 A | 5/2000 | Toyoda et al. |
| 6,097,023 A | 8/2000 | Schofield et al. |
| 6,111,683 A | 8/2000 | Cammenga et al. |
| 6,114,688 A | 9/2000 | Tanaka et al. |
| 6,169,295 B1 | 1/2001 | Koo |
| 6,196,688 B1 | 3/2001 | Caskey et al. |
| 6,313,457 B1 | 11/2001 | Bauer et al. |
| 6,320,182 B1 | 11/2001 | Hubble, III et al. |
| 6,323,487 B1 | 11/2001 | Wu |
| 6,359,274 B1 | 3/2002 | Nixon et al. |
| 6,376,824 B1 | 4/2002 | Michenfelder et al. |
| 6,379,013 B1 | 4/2002 | Bechtel et al. |
| 6,389,687 B1 | 5/2002 | Glenn et al. |
| 6,396,040 B1 | 5/2002 | Hill |
| 6,402,328 B1 | 6/2002 | Bechtel et al. |
| 6,441,886 B2 | 8/2002 | Suzuki et al. |
| 6,504,142 B2 | 1/2003 | Nixon et al. |
| 6,521,916 B2 | 2/2003 | Roberts et al. |
| 6,547,404 B2 | 4/2003 | Schierbeek |
| 6,548,808 B2 | 4/2003 | Ozawa |
| 6,618,181 B2 | 9/2003 | Bauer et al. |
| 6,679,608 B2 | 1/2004 | Bechtel et al. |
| 6,831,268 B2 | 12/2004 | Bechtel et al. |
| 6,918,674 B2 | 7/2005 | Drummond et al. |
| 6,947,077 B1 | 9/2005 | Krymski |
| 7,311,406 B2 | 12/2007 | Schofield et al. |
| 7,342,707 B2 | 3/2008 | Roberts et al. |
| 7,361,875 B2 | 4/2008 | Bechtel et al. |
| 7,524,092 B2 | 4/2009 | Rodriguez Barros et al. |
| 7,543,946 B2 | 6/2009 | Ockerse et al. |
| 7,855,755 B2 | 12/2010 | Weller et al. |
| 7,926,960 B2 | 4/2011 | Skiver et al. |
| 8,339,526 B2 | 12/2012 | Minikey, Jr. et al. |
| 9,207,116 B2 | 12/2015 | Nelson et al. |
| 2004/0008410 A1 | 1/2004 | Stam et al. |
| 2004/0218277 A1 | 11/2004 | Bechtel et al. |
| 2005/0024729 A1 | 2/2005 | Ockerse et al. |
| 2005/0168737 A1 | 8/2005 | Bradshaw et al. |
| 2006/0274540 A1* | 12/2006 | Klaver .................. B60Q 3/80 362/479 |
| 2007/0217559 A1 | 9/2007 | Stott et al. |
| 2009/0009917 A1 | 1/2009 | Moon |
| 2013/0332100 A1 | 12/2013 | Young et al. |

FOREIGN PATENT DOCUMENTS

| | | |
|---|---|---|
| DE | 2946561 | 5/1981 |
| DE | 19526249 | 2/1996 |
| EP | 0000653 | 2/1979 |
| EP | 0201938 | 11/1986 |
| FR | 2641237 | 7/1990 |
| FR | 2726144 | 4/1996 |
| GB | 2056059 | 3/1981 |
| GB | 2169861 | 7/1986 |
| GB | 2342502 | 4/2000 |
| JP | 5036790 | 11/1975 |
| JP | 59199347 | 11/1984 |
| JP | 60-012741 A | 1/1985 |
| JP | 61291241 | 12/1986 |
| JP | 0174413 | 3/1989 |
| JP | 01237232 | 9/1989 |
| JP | 05-281032 | 10/1993 |
| JP | 05340816 | 12/1993 |
| JP | 08107235 | 4/1996 |
| JP | 8166221 | 6/1996 |
| JP | 9126998 | 5/1997 |
| JP | 09331075 | 12/1997 |
| JP | 10-65971 | 3/1998 |
| JP | 11087785 | 3/1999 |
| JP | 2000031582 | 1/2000 |
| JP | 2000133821 | 5/2000 |
| JP | 2001077424 | 3/2001 |
| JP | 2001094879 | 4/2001 |
| JP | 2002134794 | 5/2002 |
| JP | 2006018663 | 1/2006 |
| JP | 2006-032438 | 2/2006 |
| JP | 2007534964 | 11/2007 |
| JP | 2009002727 | 1/2009 |
| JP | 2012-231031 | 11/2012 |
| WO | 8605147 | 9/1986 |
| WO | 0249881 | 6/2002 |

OTHER PUBLICATIONS

Tohru Shimizu et al., Development of PWM DRL With Low RF Emissions and Low Heat, SAE Paper No. 980322, Feb. 23, 1998, pp. 113-117.

Christopher M. Kormanyos, HID System with Adaptive Vertical Aim Control, SAE Paper No. 980003, Feb. 23, 1998, pp. 13-18.

Franz-Josef Kalze, Xenon Light for Main and Dipped Beam, SAE Paper No. 980005, Feb. 23, 1998, pp. 23-26.

* cited by examiner

LIGHT SENSOR HAVING PARTIALLY OPAQUE OPTIC

CROSS-REFERENCE TO RELATED APPLICATIONS

This application is a divisional application of U.S. patent application Ser. No. 14/341,933, filed on Jul. 28, 2014, entitled "LIGHT SENSOR HAVING PARTIALLY OPAQUE OPTIC," which is a continuation-in-part of U.S. patent application Ser. No. 13/764,971, filed on Feb. 12, 2013, entitled "LIGHT SENSOR," the entire disclosures of which are incorporated by reference. U.S. patent application Ser. No. 14/341,933 also claims the priority benefit of U.S. Provisional Patent Application No. 61/858,820 entitled "LIGHT SENSOR HAVING PARTIALLY OPAQUE OPTIC," filed on Jul. 26, 2013, by Barry K. Nelson et al., the entire disclosure of which is incorporated herein by reference.

FIELD OF THE INVENTION

The present invention generally relates to light sensors, and more particularly relates to light sensors used in rearview assemblies of vehicles.

SUMMARY OF THE INVENTION

According to one embodiment, a display assembly for a vehicle is provided that comprises: a housing configured for mounting to the vehicle; a display element disposed in the housing that displays images of a scene exterior of the vehicle; a light sensor assembly disposed in the housing; and a controller for receiving the electrical signal of the light sensor and for adjusting a brightness of the images displayed by the display element. The light sensor comprises: a light sensor for outputting an electrical signal representing intensity of light impinging upon a light-receiving surface of the light sensor; and a secondary optical element configured to receive light, wherein the light passes through the secondary optical element to the light sensor, the secondary optical element including a tint material that is substantially color neutral for attenuating light passing therethrough.

According to another embodiment, a rearview assembly for a vehicle is provided that comprises: a housing configured for mounting to the vehicle; a rearview element disposed in the housing that presents images of a scene rearward of the vehicle; a light sensor assembly disposed in the housing, the light sensor comprising: a light sensor for outputting an electrical signal representing intensity of light impinging upon a light-receiving surface of the light sensor; a secondary optical element configured to receive light, wherein the light passes through the secondary optical element to the light sensor, the secondary optical element including a tint material that is substantially color neutral for attenuating light passing therethrough; and a controller for receiving the electrical signal of the light sensor and for adjusting a brightness of the images presented by the rearview element.

According to another embodiment, a light sensor is provided that comprises: an exposed light transducer operative to accumulate charge in proportion to light incident on the exposed light transducer over an integration period; a shielded light transducer shielded from light, the shielded light transducer having substantially the same construction as the exposed light transducer, the shielded light transducer operative to accumulate charge in proportion to noise over the integration period; and a light-to-pulse circuit in communication with the exposed light transducer and the shielded light transducer, the light-to-pulse circuit operative to output a pulse having a pulse width based on the difference between the charges accumulated by the exposed and shielded light transducers, wherein the light-to-pulse circuit includes a one shot logic circuit that contributes to generation of the pulse.

According to another embodiment, a light sensor package is provided that comprises: an enclosure having a window for receiving light, the enclosure admitting at least a power connection pad, a ground connection pad, and an input/output pad; a capacitor provided at the input/output pad and connected between the input/output pad and ground for blocking static electricity; an exposed light transducer disposed within the enclosure, the exposed light transducer operative to accumulate charge in proportion to light received through the window incident on the exposed light transducer over an integration period; and a light-to-pulse circuit in communication with the exposed light transducer, the light-to-pulse circuit operative to output a pulse on the output pin, the pulse width based on the charge accumulated by the exposed light transducer.

According to another embodiment, a light sensor package is provided that comprises: an enclosure having a window for receiving light, the enclosure admitting at least a power connection pad, a ground connection pad, and an input/output pad; an input low pass filter provided at the input/output pad for blocking electromagnetic interference; an exposed light transducer disposed within the enclosure, the exposed light transducer operative to accumulate charge in proportion to light received through the window incident on the exposed light transducer over an integration period; and a light-to-pulse circuit in communication with the exposed light transducer, the light-to-pulse circuit operative to output a pulse on the output pin, the pulse width based on the charge accumulated by the exposed light transducer.

According to another embodiment, a light sensor is provided that comprises: an exposed light transducer operative to accumulate charge in proportion to light incident on the exposed light transducer over an integration period; a light-to-pulse circuit in communication with the exposed light transducer, the light-to-pulse circuit operative to output a pulse having a pulse width based on the charge accumulated by the exposed light transducer; and a bandgap voltage reference circuit for receiving power from a power source and for generating a set of stable reference voltages to the light-to-pulse circuit, wherein the bandgap voltage reference circuit generates a constant current from the supply voltage supplied by the power supply and wherein the bandgap voltage reference circuit comprises a resistive ladder through which the constant current is passed to generate the set of stable reference voltages.

According to another embodiment, a light sensor is provided that comprises: an exposed light transducer operative to accumulate charge in proportion to light incident on the exposed light transducer over an integration period; a light-to-pulse circuit in communication with the exposed light transducer, the light-to-pulse circuit operative to output a pulse having a pulse width based on the charge accumulated by the exposed light transducer; and a bandgap voltage reference circuit for receiving power from a power source having a supply voltage level in a range of about 3.3V to about 5.0V, and for generating a set of stable reference voltages throughout the supply voltage level range to the light-to-pulse circuit.

According to another embodiment, a light sensor package is provided that comprises: an enclosure having a window for receiving light, the enclosure admitting at least a power connection pad, a ground connection pad, and an input/output pad; an exposed light transducer disposed within the enclosure, the exposed light transducer operative to accumulate charge in proportion to light received through the window incident on the exposed light transducer over an integration period; a light-to-pulse circuit in communication with the exposed light transducer, the light-to-pulse circuit operative to output a pulse on the output pin, the pulse width based on the charge accumulated by the exposed light transducer over the integration period; and a nonvolatile memory within the enclosure for storing data from which calibration data may be obtained for the light sensor.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
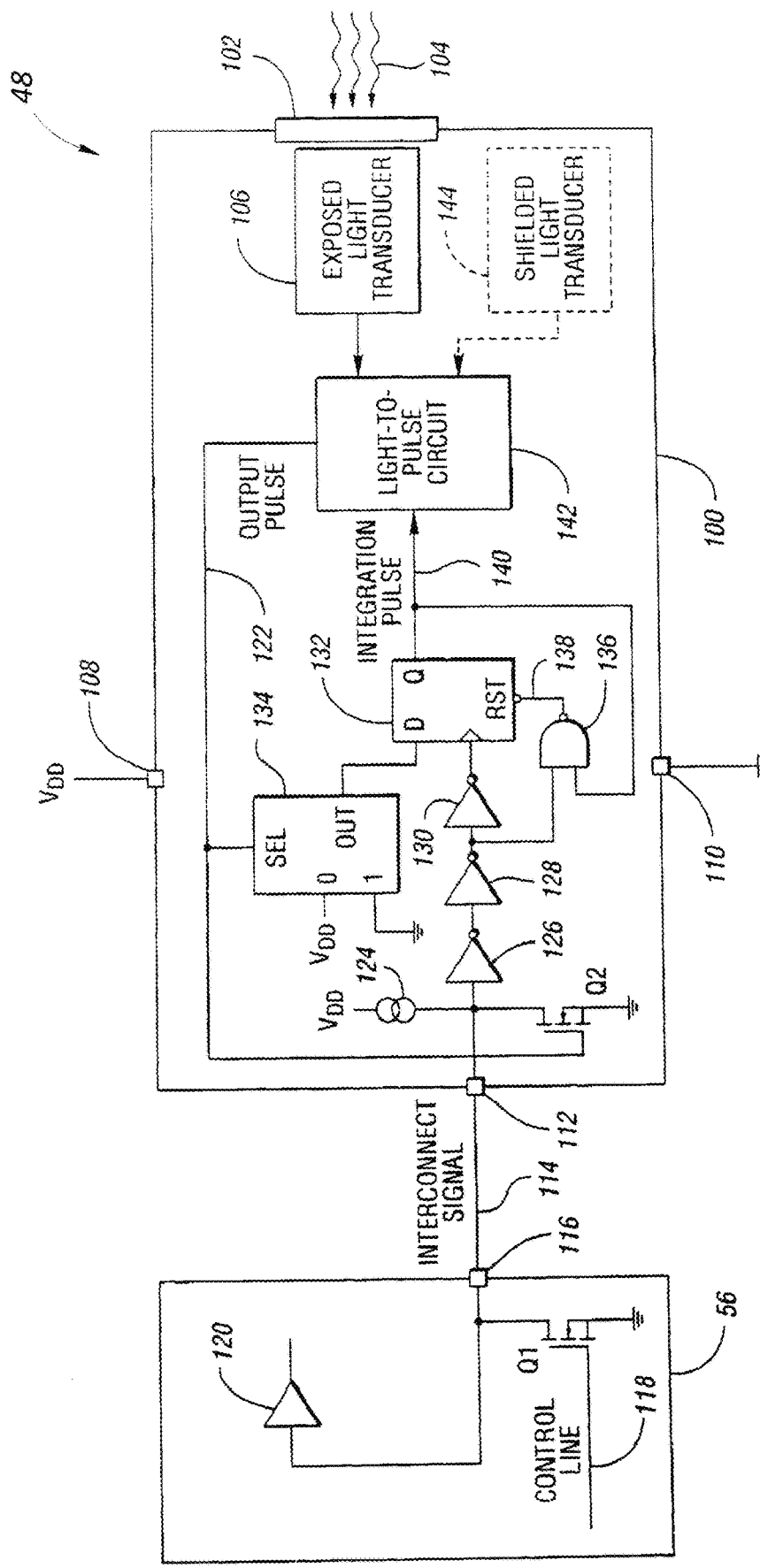
FIG. 1 is an electrical circuit diagram in block and schematic form of a light sensor in which embodiments of the inventive light-to-pulse circuit may be implemented.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein are improvements to the light sensor as disclosed in commonly-assigned U.S. Pat. No. 6,359,274, the entire disclosure of which is incorporated herein by reference. The photodiode light sensor circuitry as disclosed in U.S. Pat. No. 6,359,274 is shown in FIG. 1 and includes a light sensor 48 and control logic circuitry 56 responsive to the sensor, which is interconnected by a single line carrying both integration control and sensor outputs. Light sensor 48 includes an enclosure 100 with a window 102 admitting light 104 incident on an exposed light transducer 106. Enclosure 100 admits a power pin 108, a ground pin 110, and a signal pin 112.

Light sensor 48 is connected to control logic 56 through an interconnection signal 114 between signal pin 112 in light sensor 48 and signal pin 116 in control logic 56. Signal pins 112, 116 are tri-state ports permitting interconnect signal 114 to provide both an input to light sensor 48 and an output from light sensor 48. Control logic 56 may include an FET Q1 connected between signal pin 116 and ground. FET Q1 is controlled by a control line 118 connected to the base of Q1. A buffer 120 is also connected to signal pin 116.

Within light sensor 48, an FET Q2 is connected between signal pin 112 and ground. FET Q2 is controlled by an output pulse 122 connected to the gate of Q2. A constant current source 124 is connected to signal pin 112 so that if neither Q1 nor Q2 is on, interconnect signal 114 is pulled high. Constant current source 124 nominally sources about 0.5 mA to pull up interconnect signal 114. The input of a Schmidt trigger inverter 126 is connected to signal pin 112. Schmidt trigger inverter 126 is followed by inverters 128 and 130 in series. The output of inverter 130 clocks a D flip-flop 132. The output of a multiplexer 134 is connected to the D input of flip-flop 132. The select input of multiplexer 134 is driven by output pulse 122 such that when output pulse 122 is asserted, the D input of flip-flop 134 is unasserted and when output pulse 122 is not asserted, the D input of flip-flop 134 is asserted. The output of a NAND gate 136 is connected to a low asserting reset 138 of flip-flop 132. The output of flip-flop 132 is an integration pulse 140. Integration pulse 140 and the output of inverter 128 are inputs to NAND gate 136. A light-to-pulse circuit 142 accepts integration pulse 140 and the output of exposed light transducer 106 and produces output pulse 122. Two of the several disclosed embodiments for light-to-pulse circuit 142 are described below with regard to FIGS. 3-5.

Light sensor 48 may include a shielded light transducer 144 which does not receive light 104. Light-to-pulse circuit 142 uses the output of shielded light transducer 144 to reduce the effects of noise in exposed light transducer 106.

Figure 2:
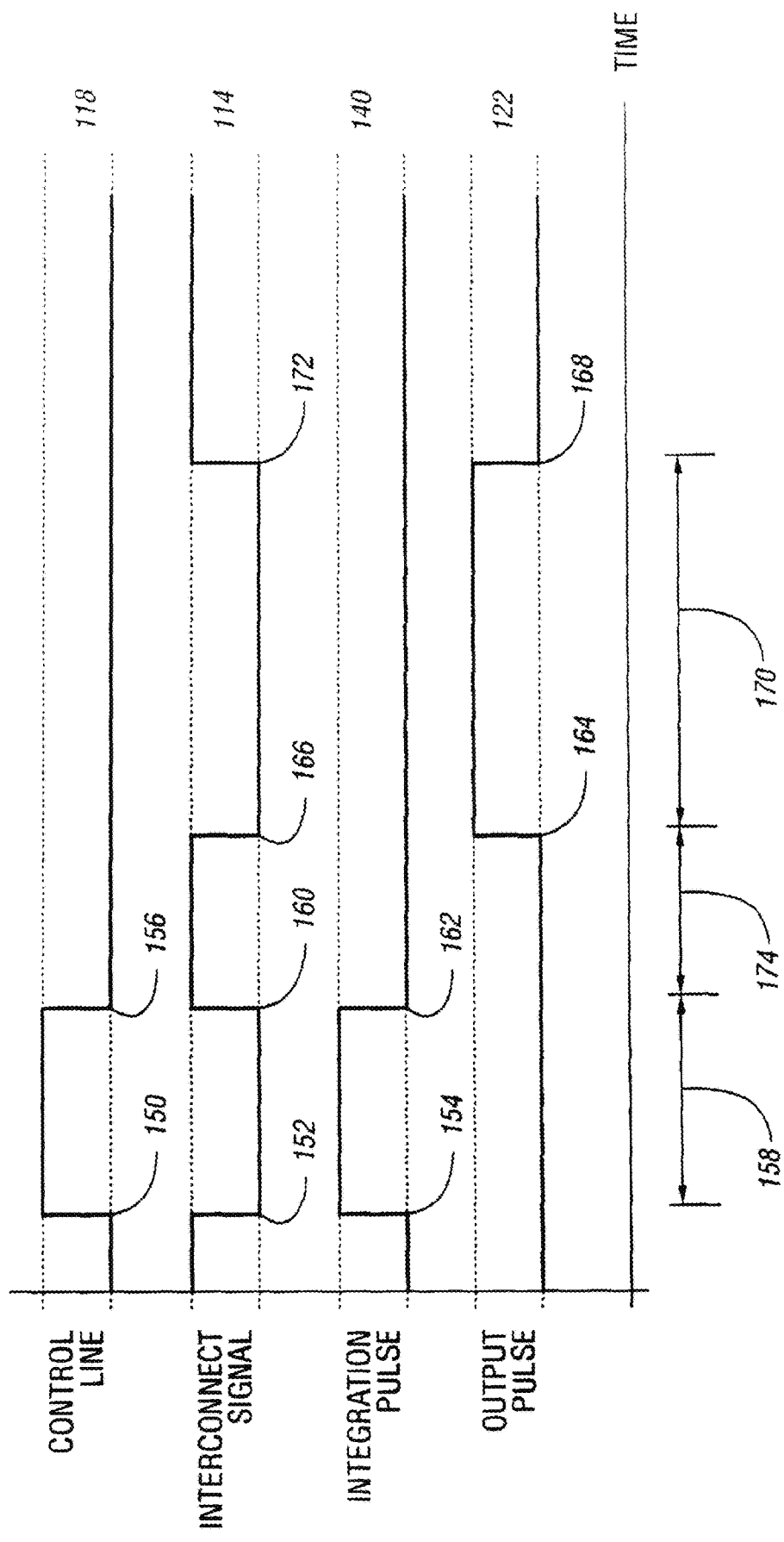
FIG. 2 is a timing diagram illustrating operation of the circuitry of FIG. 1.

Referring now to FIG. 2, a timing diagram illustrating operation of the circuitry of FIG. 1 is shown. Initially, low asserting interconnect signal 114 is high. The state of flip-flop 132 must be zero for, if the state is one, both inputs to NAND gate 136 would be high, asserting reset 138 and forcing the state of flip-flop 132 to zero.

At time 150, control logic 56 asserts control line 118 turning transistor Q1 on. Interconnect signal 114 is then pulled low at time 152. The output of inverter 130 transitions from low to high setting the state of flip-flop 132 to one which causes integration pulse 140 to become asserted at time 154. Light-to-pulse circuit 142 begins integrating light 104 incident on exposed light transducer 106. At time 156, control line 118 is brought low turning transistor Q1 off. The difference between time 156 and time 150 is the integration period 158 requested by control logic 56. Since both Q1 and Q2 are off, interconnect signal 114 is pulled high by current source 124 at time 160. Since the output of inverter 128 and integration pulse 140 are both high, reset 138 is asserted causing the state of flip-flop 132 to change to zero and integration pulse 140 to become unasserted at time 162. This signals light-to-pulse circuit 142 to stop integrating light 104 incident on exposed light transducer 106.

At time 164, light-to-pulse circuit 142 asserts output pulse 122 to begin outputting light intensity information. Asserting output pulse 122 turns transistor Q2 on, pulling interconnect signal 114 low at time 166. This causes inverter 130 to output a low-to-high transition clocking a zero as the state of flip-flop 132. Light-to-pulse circuit 142 deasserts output pulse 122 at time 168. The difference between time 168 and time 164 is a light intensity period 170 indicating the amount of light 104 incident on exposed light transducer 106 over integration period 158. Transistor Q2 is turned off when output pulse 122 goes low at time 168. Since both transistors Q1 and Q2 are off, interconnect signal 114 is pulled high at time 172. Buffer 120 in dimming logic 56 detects the transitions in interconnect signal 114 at times 166 and 172. The difference in time between times 172 and 166 is used by dimming logic 56 to determine the intensity of light 104 received by light sensor 48.

If shielded light transducer 144 is included in light sensor 48, the difference in time between the deassertion of integration pulse 140 at time 162 and the assertion of output pulse 122 at time 164 is due, in part, to the thermal noise in light sensor 48. This difference is expressed as thermal noise period 174. Thermal noise period 174 may be used by dimming logic 56 to determine the temperature of light sensor 48 or may be more simply used to determine if the noise level in sensor 48 is too high for a reliable reading. The ability of light sensor 48 to use the output from shielded light transducer 144 to generate output pulse 122 indicative of the amount of thermal noise in light sensor 48 is described with regard to FIG. 3 below.

Figure 3:
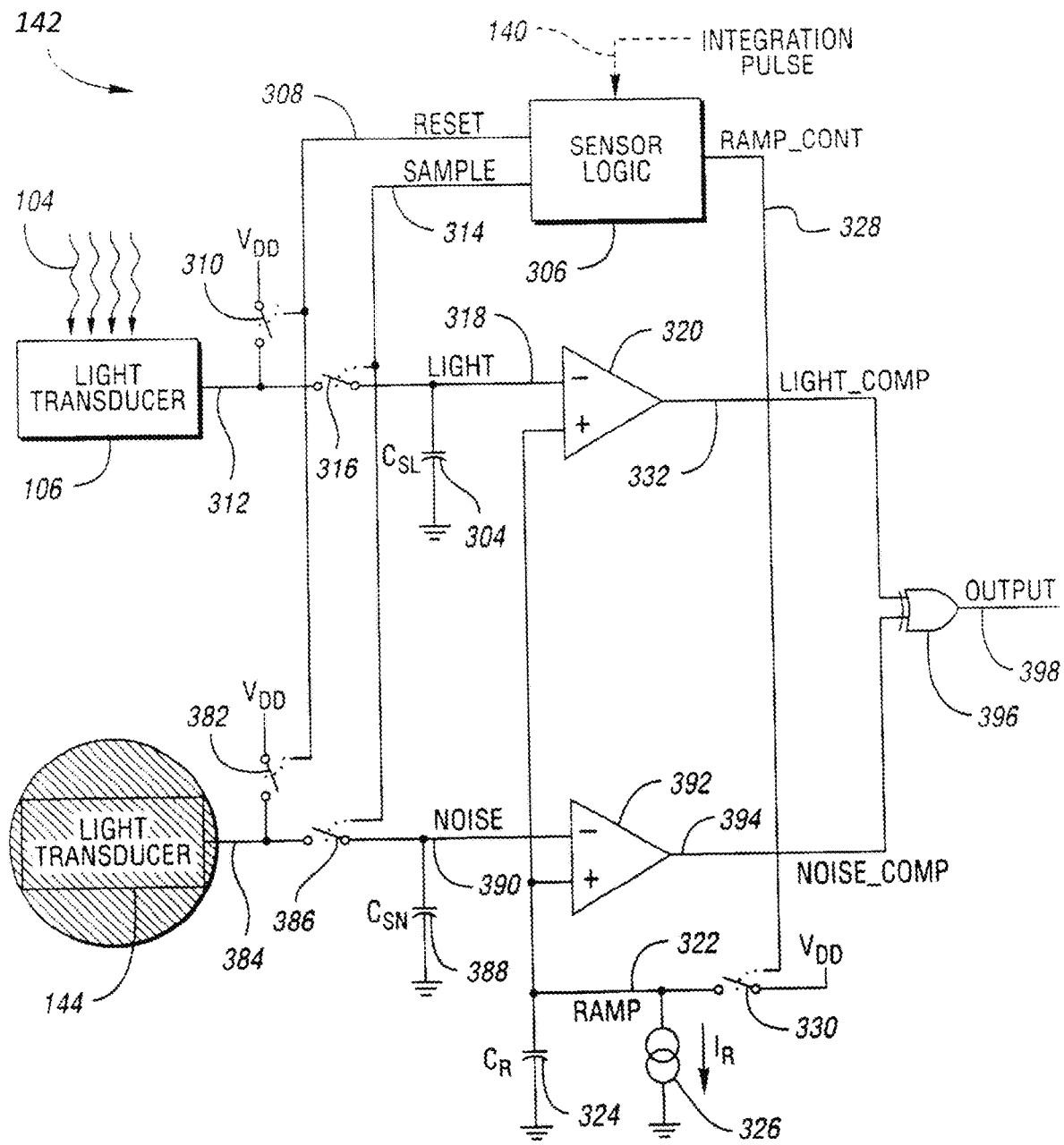
FIG. 3 is an electrical circuit diagram in block and schematic form illustrating a light-to-pulse circuit with noise compensation according to a prior conventional construction.

Referring now to FIG. 3, a schematic diagram illustrating operation of a light sensor having a pulse output according to an embodiment of the present invention is shown. Light-to-pulse circuit 142 includes an exposed light transducer 106 for converting light 104 incident on exposed light transducer 106 into charge accumulated in light storage capacitor 304, indicated by $C_{SL}$, and a shielded light transducer 144 and associated electronics. Exposed light transducer 106 may be any device capable of converting light 104 into charge, such as the photogate sensor described in U.S. Pat. No. 5,471,515 entitled "Active Pixel Sensor With Intra-Pixel Charge Transfer" to E. Fossum et al., which is incorporated herein by reference. Preferably, light transducer 106 is a photodiode such as is described with regards to FIG. 5 below. Except as noted, the following discussion does not depend on a particular type or construction for exposed light transducer 106.

Light-to-pulse circuit 142 operates under the control of sensor logic 306. Sensor logic 306 generates a reset signal 308 controlling a switch 310 connected between exposed light transducer output 312 and $V_{DD}$. Sensor logic 306 also produces a sample signal 314 controlling a switch 316 between exposed light transducer output 312 and a light storage capacitor 304. The voltage across light storage capacitor 304, light storage capacitor voltage 318, is fed into one input of a comparator 320. The other input of comparator 320 is a ramp voltage 322 across a ramp capacitor 324. Ramp capacitor 324 is in parallel with a current source 326 generating current $I_R$. Sensor logic 306 further produces a ramp control signal 328 controlling a switch 330 connected between ramp voltage 322 and $V_{DD}$. Comparator 320 produces a comparator output 332 based on the relative levels of light storage capacitor voltage 318 and ramp voltage 322. Sensor logic 306 may generate reset signal 308, sample signal 314, and ramp control signal 330 based on internally generated timing or on externally generated integration pulse 140 as described with regard to FIG. 4 below.

Shielded light transducer 144 may have the same construction as exposed light transducer 106. However, shielded light transducer 144 does not receive light 104. Charge generated by shielded light transducer 144, therefore, is only a function of noise. This noise is predominately thermal in nature. If shielded light transducer 144 has the same construction as exposed light transducer 106, the noise signal produced by shielded light transducer 144 will closely approximate the same noise within the signal produced by exposed light transducer 106. By subtracting the signal produced by shielded light transducer 144 from the signal produced by exposed light transducer 106, the effect of noise in light transducer 106 can be greatly reduced.

Reset signal 308 controls a switch 382 connected between a shielded transducer output 384 and $V_{DD}$. Sample signal 314 controls a switch 386 connected between shielded transducer output 384 and a noise storage capacitor 388, indicated by $C_{SN}$. The voltage across noise storage capacitor 388, noise storage capacitor voltage 390, is one input to a comparator 392. The second input to comparator 392 is ramp voltage 322. The output of comparator 392, noise comparator output 394, and comparator output 332 serve as inputs to exclusive-OR gate 396. Exclusive-OR gate 396 generates an exclusive-OR output 398 corresponding to output pulse 122 indicating the intensity of light 104.

Figure 4:
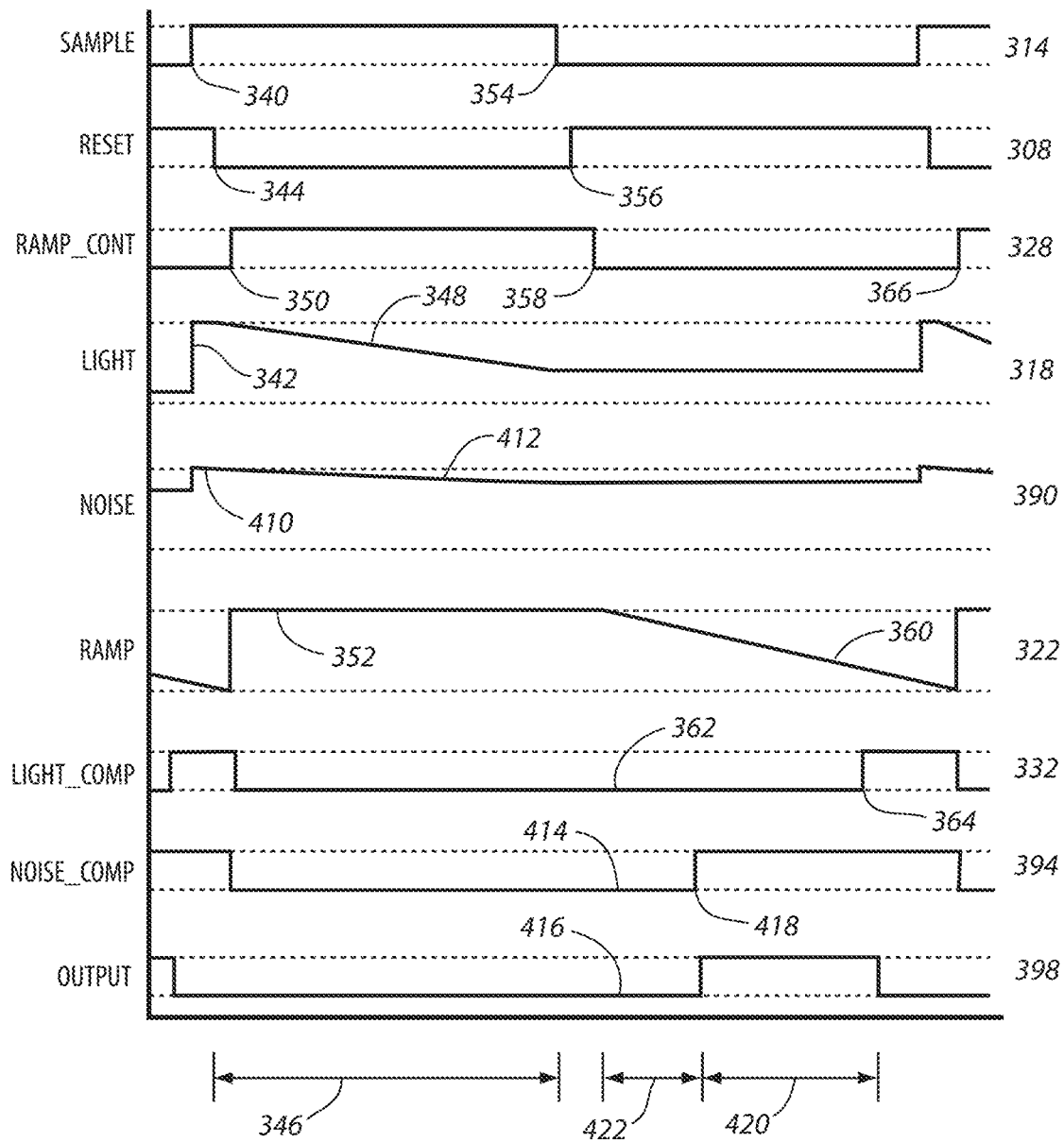
FIG. 4 is a timing diagram illustrating operation of the light sensor of FIG. 3.

Referring now to FIG. 4, a timing diagram illustrating operation of the light-to-pulse circuit 142 of FIG. 3 is shown. A measurement cycle is started at time 340 when sample signal 314 is asserted while reset signal 308 is asserted. Switches 310 and 316 are both closed charging light storage capacitor 304 to $V_{DD}$ as indicated by voltage level 342 in light storage capacitor voltage 318. Similarly, switches 382 and 386 are both closed charging noise storage capacitor 388 to $V_{DD}$ as indicated by voltage level 410 in noise storage capacitor voltage 390. At time 344, reset signal 308 is deasserted opening switch 310 and beginning integration period 346. During integration period 346, light 104 incident on exposed light transducer 106 generates negative charge causing declining voltage 348 in light storage capacitor voltage 318. The deassertion of reset signal 308 also opens switch 382 and causes declining voltage 412 in noise storage capacitor voltage 390 from charge produced by shielded light transducer 144 due to noise. At time 350, ramp control signal 328 is asserted closing switch 330 and charging ramp capacitor 324 so that ramp voltage 322 is $V_{DD}$ as indicated by voltage level 352. At time 354, sample signal 314 is deasserted causing switches 316 and 386 to open, thereby ending integration period 346. At some time 356 following time 354 and prior to the next measurement cycle, reset signal 308 is asserted closing switches 310 and 382. At time 358, ramp control signal 328 is deasserted opening switch 330. This causes ramp capacitor 324 to discharge at a constant rate through current source 326 as indicated by declining voltage 360 in ramp voltage 322. Initially, as indicated by voltage level 362, light comparator output 332 is unasserted because ramp voltage 322 is greater than light storage capacitor voltage 318. Also initially, as indicated by voltage level 414, noise comparator output 394 is unasserted because ramp voltage 322 is greater than noise storage capacitor voltage 390. Since light comparator output 332 is also unasserted, output 398 from exclusive-OR gate 396 is unasserted as indicated by voltage level 416. At time 418, ramp voltage 322 drops below the level of noise storage capacitor voltage 390, causing noise comparator output 394 to become asserted. Since noise comparator output 394 and light comparator output 332 are different, output 398 from exclusive-OR gate 396 is asserted. At time 364, ramp voltage 322 drops beneath the level of light storage capacitor voltage 318, causing light comparator output 332 to become asserted. Since both noise comparator output 394 and light comparator output 332 are now asserted, output 398 from exclusive-OR gate 396 now becomes unasserted. The difference between time 364 and time 418, output pulse duration 420, has a time period proportional to the intensity of light 104 incident on exposed light transducer 106 less noise produced by shielded light transducer 144 over integration period 346. The duration between time 418 and time 358, noise duration 422, is directly proportional to the amount of noise developed by shielded light transducer 144 over integration period 346. Since the majority of this noise is thermal noise, noise duration 422 is indicative of shielded light transducer 144 temperature. Comparator outputs 332 and 394 remain asserted until time 366 when ramp control signal 328 is asserted closing switch 330 and pulling ramp voltage 322 to $V_{DD}$.

Figure 5:
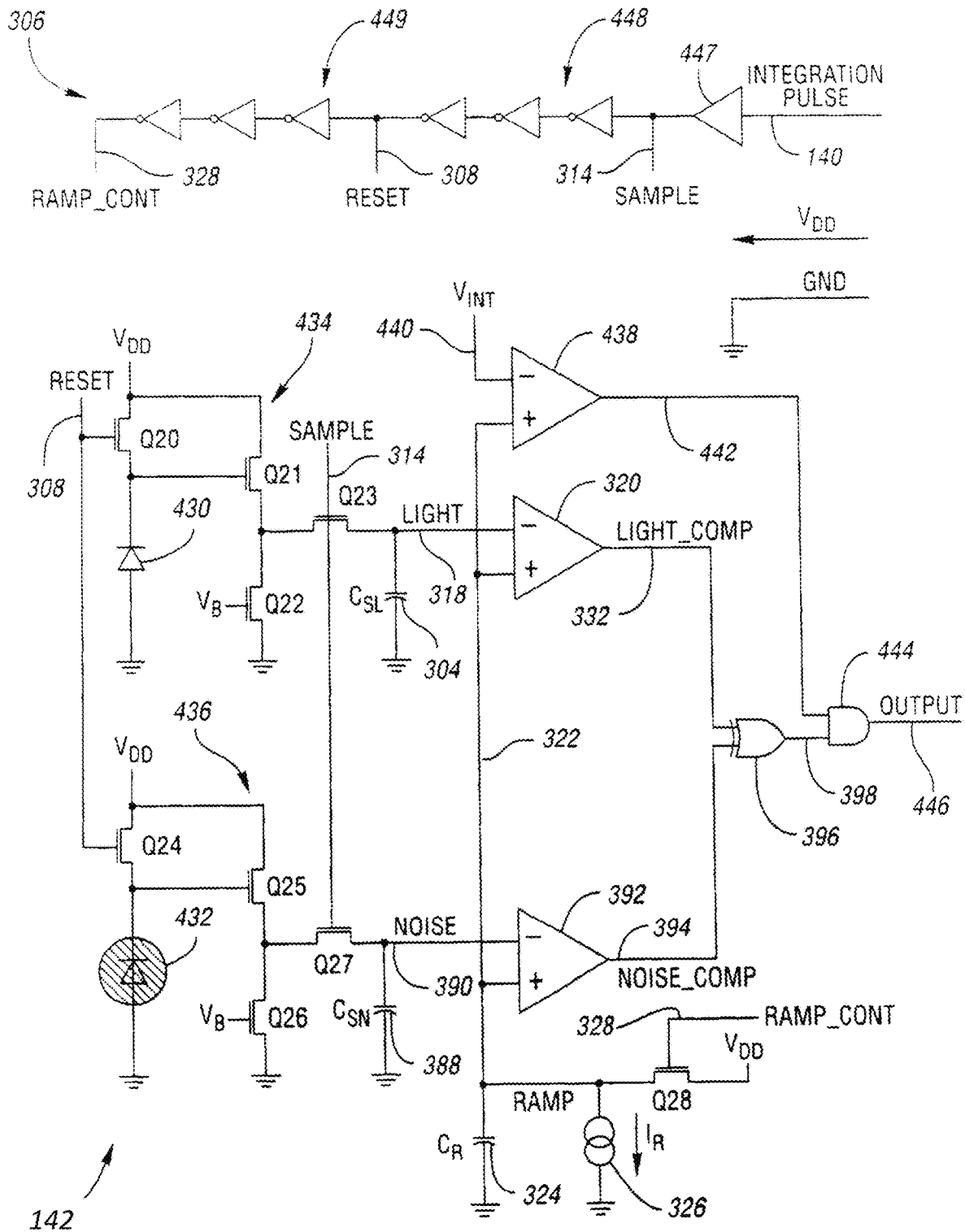
FIG. 5 is a schematic diagram of an implementation of the light sensor of FIG. 3 using photodiodes as light transducers.

Referring now to FIG. 5, a schematic diagram is shown of a second implementation of the light-to-pulse circuit 142 and light sensor 48 of FIG. 1 where photodiodes are used as light transducers. Light-to-pulse circuit 142 is implemented using an exposed photodiode 430 for exposed light transducer 106 and a shielded photodiode 432 for shielded light transducer 144. The anode of exposed photodiode 430 is connected to ground and the cathode is connected through a transistor Q20 to $V_{DD}$. The base of transistor Q20 is controlled by reset signal 308. Hence, transistor Q20 functions as switch 310. Transistors Q21 and Q22 are connected in series between $V_{DD}$ and ground to form a buffer, shown generally by 434. The base of transistor Q21 is connected to the cathode of exposed photodiode 430. The base of load transistor Q22 is connected to a fixed voltage $V_B$. The output of buffer 434 is connected through a transistor Q23 to light storage capacitor 304. The base of transistor Q23 is driven by sample signal 314, permitting transistor Q23 to function as switch 316. The anode of shielded photodiode 432 is connected to ground and the cathode is connected to $V_{DD}$ through a transistor Q24. The base of transistor Q24 is driven by reset signal 308 permitting transistor Q24 to function as switch 382. Transistors Q25 and Q26 form a buffer, shown generally by 436, isolating the output from shielded photodiode 432 in the same manner that buffer 434 isolates exposed photodiode 430. Transistor Q27 connects the output of buffer 436 to noise storage capacitor 388. The base of transistor Q27 is driven by sample signal 314 permitting transistor Q27 to function as switch 386. Typically, light storage capacitor 304 and noise storage capacitor 388 are 2 pF. Ramp capacitor 324, typically 10 pF, is charged to $V_{DD}$ through a transistor Q28. The base of transistor Q28 is driven by ramp control signal 328 permitting transistor Q28 to function as switch 330. Ramp capacitor 324 is discharged through current source 326 at an approximately constant current $I_R$ of 0.1 μA when transistor Q28 is off.

Sensor power-up response is improved and the effective dynamic range extended by including circuitry to inhibit output if ramp voltage 322 drops beneath a preset voltage. Light-to-pulse circuit 142 includes a comparator 438 comparing ramp voltage 322 with an initialization voltage ($V_{INIT}$) 440. Comparator output 442 is ANDed with exclusive-OR output 398 by an AND gate 444 to produce AND gate output 446 corresponding to output pulse 122. During operation, if ramp voltage 322 is less than initialization voltage 440, output 446 is deasserted. The use of comparator 438 and gate 444 guarantees that output 446 is not asserted regardless of the state of light-to-pulse circuit 142 following power-up. In a preferred embodiment, the initialization voltage is 0.45 V.

Sensor logic 306 generates control signals 308, 314, 328 based on integration pulse 140 which may be generated internally or provided from an external source. A buffer 447 receives integration pulse 140 and produces sample control 314. An odd number of sequentially connected inverters, shown generally as inverter train 448, accepts sample control 314 and produces reset control 308. A second set of odd numbered sequentially connected inverters, shown generally as inverter train 449, accepts reset signal 308 and produces ramp control signal 328.

The above described light sensors thus include light transducers which convert incident light into charge. This charge is collected over an integration period to produce a potential which is converted by the sensor into a discrete output. By varying the integration period, the sensitivity range of the sensor may be dynamically varied.

As described in detail below, the first embodiment improves upon the above described light sensor in several respects. First, the improved light sensor provides better noise performance and electromagnetic interference (EMI) immunity by utilizing a low pass filter at the input/output (I/O) pin of the sensor. Second, the improved light sensor ensures there is always an output pulse of some length such that the sensor does not appear as a bad sensor to any external circuitry by utilizing a one shot logic circuit at its output in place of exclusive-OR gate 396 in the prior light sensor shown in FIGS. 3 and 5. Third, the improved sensor provides dual voltage operating capability so as to run at either 3.3V or 5V $V_{DDA}$. Fourth, the improved sensor provides improved static capability. Fifth, by using a different form of voltage regulator, the improved sensor provides greater stability in its output in the presence of power supply fluctuations.

Figure 6:
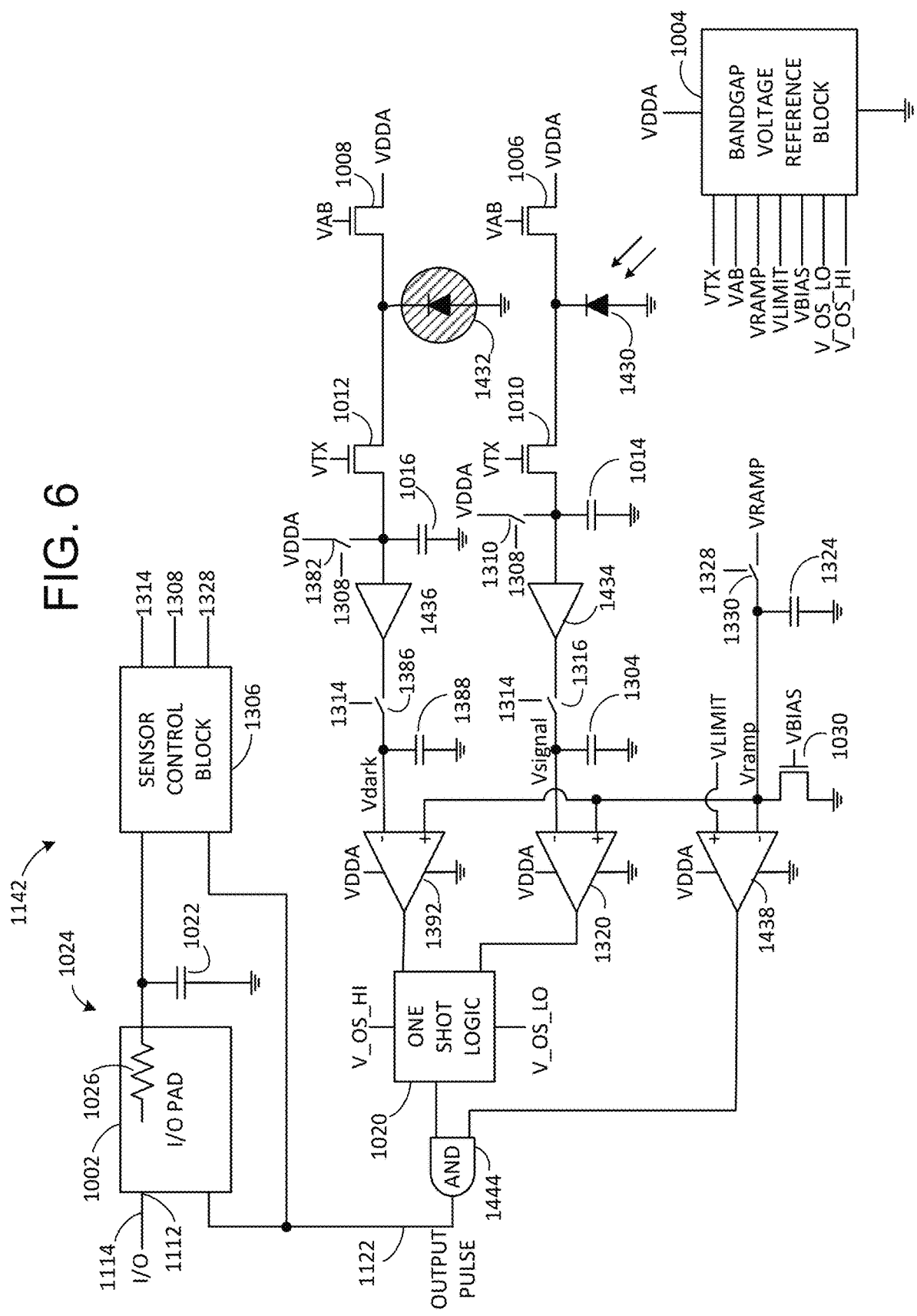
FIG. 6 is an electrical circuit diagram in block and schematic form of a light-to-pulse circuit according to one embodiment of the present invention.

FIG. 6 shows an improved light-to-pulse circuit 1142, which includes an exposed light transducer shown in the form of an exposed photodiode 1430 and a shielded light transducer in the form of a shielded photodiode 1432. Photodiodes 1430 and 1432 may have integral anti-bloom gates 1006 and 1008, respectively, which receive an anti-bloom voltage $V_{AB}$ that is supplied by a voltage reference block 1004, as described further below. Likewise, photodiodes 1430 and 1432 may have integral transmission gates 1010 and 1012, respectively, which receive a transmission voltage $V_{TX}$ that is also supplied by voltage reference block 1004. The functionality of anti-bloom gates 1006 and 1008 and transmission gates 1010 and 1012 are described further in the above-referenced U.S. Pat. No. 6,359,274 with reference to FIGS. 25 and 26 thereof.

Light-to-pulse circuit 1142 further includes a sensor control block 1306 that is connected to an input/output (I/O) pad 1002, which in turn is connected to I/O input pin 1112 on which I/O signal 1114 propagates as both input and output. Sensor control block 1306 receives an integration pulse 1140 from I/O pad 1002 and responds by generating a reset signal 1308, a sample signal 1314, and a ramp control signal 1328 in a manner similar to that discussed above with respect to sensor logic 306 in FIGS. 3-5.

The cathode of exposed photodiode 1430 is connected to voltage $V_{DDA}$ via transmission gate 1010 and a switch 1310 that receives reset signal 1308 from sensor control block 1306. A capacitor 1014 having a capacitance of 200 fF, for example, is coupled in parallel with exposed photodiode 1430. A source follower 1434 has an input coupled to the cathode of exposed photodiode 1430 and acts as a buffer similar to buffer 434 in FIG. 5. The output of source follower 1434 is coupled to switch 1316, which receives and is responsive to sample signal 1314. Switch 1316 selectively couples the buffered output of exposed photodiode 1430 to a light storage capacitor 1304 having a capacitance of, for example, 6.5 pF. The voltage (Vsignal) across light storage capacitor 1304 is supplied to a comparator 1320, which is described further below.

The cathode of shielded photodiode 1432 is connected to voltage $V_{DDA}$ via transmission gate 1012 and a switch 1382 that receives reset signal 1308 from sensor control block 1306. A capacitor 1016 having a capacitance of 200 fF, for example, is coupled in parallel with shielded photodiode 1432. A source follower 1436 has an input coupled to the cathode of shielded photodiode 1432 and acts as a buffer similar to buffer 436 in FIG. 5. The output of source follower 1436 is coupled to switch 1386, which receives and is responsive to sample signal 1314. Switch 1386 selectively couples the buffered output of shielded photodiode 1432 to a noise storage capacitor 1388 having a capacitance of, for example, 6.5 pF. The voltage (Vdark) across noise storage capacitor 1388 is supplied to a comparator 1392, which is described further below.

Light-to-pulse circuit 1142 further includes a ramp storage capacitor 1324 that is selectively charged to a voltage VRAMP or allowed to discharge via a switch 1330 that is controlled by a ramp control signal 1328, which is supplied by sensor control block 1306. The voltage (Vramp) across ramp storage capacitor 1324 is biased by biasing transistor 1030 that receives the signal VBIAS at its gate. VBIAS is supplied by bandgap voltage reference block 1004. Vramp is supplied to a comparator 1438 and to comparators 1320 and 1392. Comparator 1438 compares Vramp to VLIMIT, which is supplied by bandgap voltage reference block 1004 and supplies an output to an AND gate 1444 in a manner similar to how comparator 438 compares RAMP to $V_{INT}$ and supplies an output to AND gate 444 in FIG. 5. Comparator 1320 compares Vsignal to Vramp and comparator 1392 compares Vdark to Vramp in much the same manner as comparators 320 and 392 in FIGS. 3 and 5. In fact, the general operation of the components of light-to-pulse circuit 1142 operate in a similar manner to that of light-to-pulse circuits 142 as described in FIGS. 3-5, and therefore the operation of the already described portion of light-to-pulse circuit 1142 will not be described further.

Light-to-pulse circuit 1142 differs from light-to-pulse circuits 142 in several respects. First, light-to-pulse circuit 1142 includes a capacitor 1022 provided at I/O pad 1002 and connected between the input line and ground. Capacitor 1022 may serve several purposes. A first purpose is for blocking static electricity. Capacitor 1022 may therefore be selected to have a capacitance such that the light sensor package is rated for at least 2 kV static protection. Such a capacitance may, for example, be 150 pF. This is a substantial improvement over the prior light sensors, which were rated for 500 V static protection and were therefore much more susceptible to static electricity.

The second purpose served by capacitor 1022 is to form an input filter 1024 with a resistance 1026 already existing within the I/O pad 1002. Such resistance is approximately 100 ohm. Thus, adding a capacitor 1022 with the above-noted small capacitance creates a low pass input filter 1024. This low pass input filter 1024 blocks electromagnetic interference (EMI) that otherwise disrupts operation of the sensor circuitry. The prior light sensors were susceptible to EMI at 900 MHz, which is the frequency at which cellular telephones operate. Thus, the prior light sensors sometimes stopped working properly when using a cell phone near the light sensor. Input filter 1024 blocks this EMI and passes the most stringent EMI testing requirements of automobile manufacturers.

Light-to-pulse circuit 1142 further differs from light-to-pulse circuits 142 in that it includes a one shot logic circuit 1020 in place of exclusive-OR gate 396. One shot logic circuit 1020 provides an improvement because the exclusive-OR gate 396 sometimes does not output a pulse due to leakage currents, which may lead to improper determination of a sensor fault because it was previously thought that if there is not a return pulse, the sensor had failed. Also, with the exclusive-OR gate 396, when the light level was initially very low and then increased, the output pulse would get smaller, go away, and then come back. This is because at such a low initial light level, it was possible that (with reference to FIG. 4) the light storage capacitor voltage 318 exceeds the ramp voltage 322 before the noise storage capacitor voltage 390 exceeds the ramp voltage 322 thereby resulting in a negative reading that still produces a pulse that cannot be distinguished from a positive reading. Subsequently, as the light level increases, the points at which the light and noise storage capacitor voltages 318 and 390 exceed the ramp voltage 322 are so close together that no output pulse is produced. One shot logic circuit 1020 minimizes chances of this happening by contributing to generation of the output pulse 1122. This is because one shot logic circuit 1020 in combination with AND gate 1444 always provides an output pulse of known length any time either or both Vdark or Vsignal exceeds Vramp. Thus, if both Vdark and Vsignal exceed Vramp in unison, one shot logic circuit 1020 and AND gate 1444 cooperate to output an output pulse 1122, which pulls the signal 1114 low on pin 1112.

Figure 7:
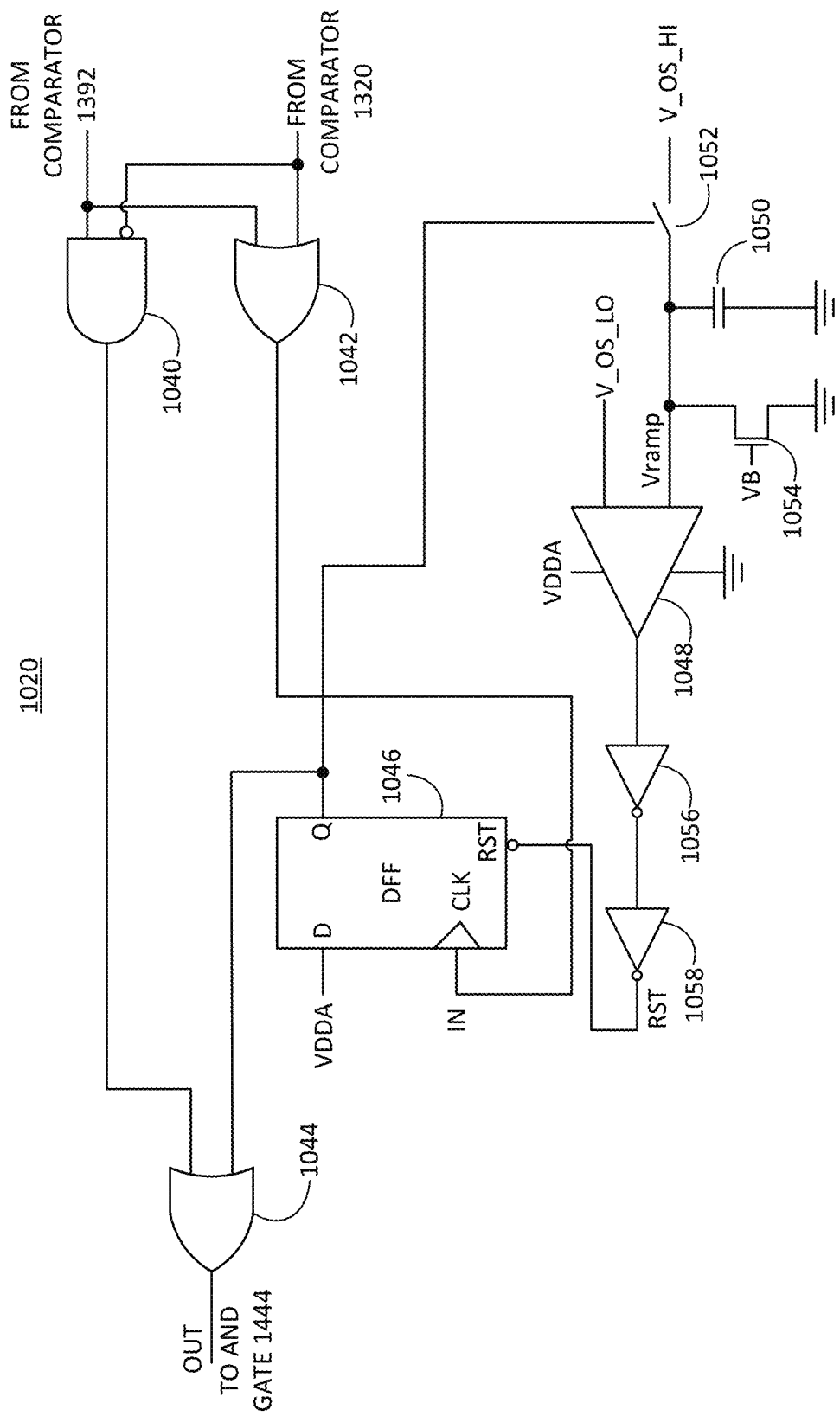
FIG. 7 is an electrical circuit diagram in block and schematic form of a one shot logic circuit that may be used in the light-to-pulse circuit shown in FIG. 6.

An example of circuitry that may be used to implement one shot logic circuit 1020 is shown in FIG. 7. One shot logic circuit 1020 may include an AND gate 1040 that receives the output of comparator 1392 (FIG. 6) in one input and receives an inverted output of comparator 1320 in the other input. One shot logic circuit 1020 may further include a first OR gate 1042 that receives the output of comparator 1392 in one input and receives the output of comparator 1320 in the other input. The output of AND gate 1040 is provided to an input of a second OR gate 1044 whose output is supplied to AND gate 1444 of FIG. 6. The output of first OR gate 1042 is provided to a clock (CLK) input terminal of a D flip-flop (DFF) 1046. The output (Q) of DFF 1046 is provided to the other input of second OR gate 1044.

As shown in FIG. 7, the DFF 1046 includes a reset (RST) terminal that is provided with an output of the circuitry provided below. A capacitor 1050 is provided that is selectively charged to a reference voltage V_OS_HI that is supplied by bandgap voltage reference circuit 1004 in FIG. 6 when a switch 1052 is closed in response to the output of DFF 1046. A biasing transistor 1054 is coupled in parallel with capacitor 1050 and the resultant voltage of capacitor 1050 is fed into a comparator 1048 where it is compared with a reference voltage V_OS_LO that is also supplied by bandgap voltage reference circuit 1004. The output of comparator 1048 is inverted twice by inverters 1056 and 1058 before being supplied to the RST terminal of DFF 1046.

The light sensor design of FIGS. 1-5 is very susceptible to fluctuations in $V_{DD}$ caused by static fluctuations and/or active noise on the power input line. In fact, static fluctuations in $V_{DD}$ of +/−10% caused variations of output by as much as 80%. In addition, when powered by a switched power supply that is inadequately filtered, there is a rippling in $V_{DD}$ that causes an inaccurate averaged output. Much of the inaccuracies and fluctuations occurred because $V_{DD}$, which fluctuated itself, was used to derive various reference voltages used by the light sensor circuitry. Moreover, if the light sensor was calibrated at exactly 5 V and later $V_{DD}$ is relatively stable but 4.5V, then the sensor was no longer calibrated.

To address these problems, light-to-voltage circuit 1142 includes a bandgap voltage reference block 1004, which provides stable reference voltages (VTX, VAB, V_OS_HI, V_OS_LO, VBIAS) regardless of the stability of the voltage supply. When using bandgap voltage reference block 1004, static fluctuations in $V_{DD}$ of +/−10% only cause variations of output by about 2%. Thus, the light sensor is much more stable over static fluctuations. Because the bandgap voltage reference block 1004 is much more immune to such supply voltage variations, it allows use with less expensive switched power supplies that may have such variations.

Also, bandgap voltage reference block 1004 may be configured to operate at a 3.3V supply voltage VDDA while being tolerant of voltages as high as 5V while still providing stable reference voltages. Thus, bandgap voltage reference block 1004 receives power from a power source having a supply voltage level in a range of about 3.3V to about 5.0V, and for generating a set of stable reference voltages throughout the supply voltage level range to the light-to-pulse circuit. In this way, the light sensor is capable of operating at dual operating voltages 3.3V and 5V.

Figure 8:
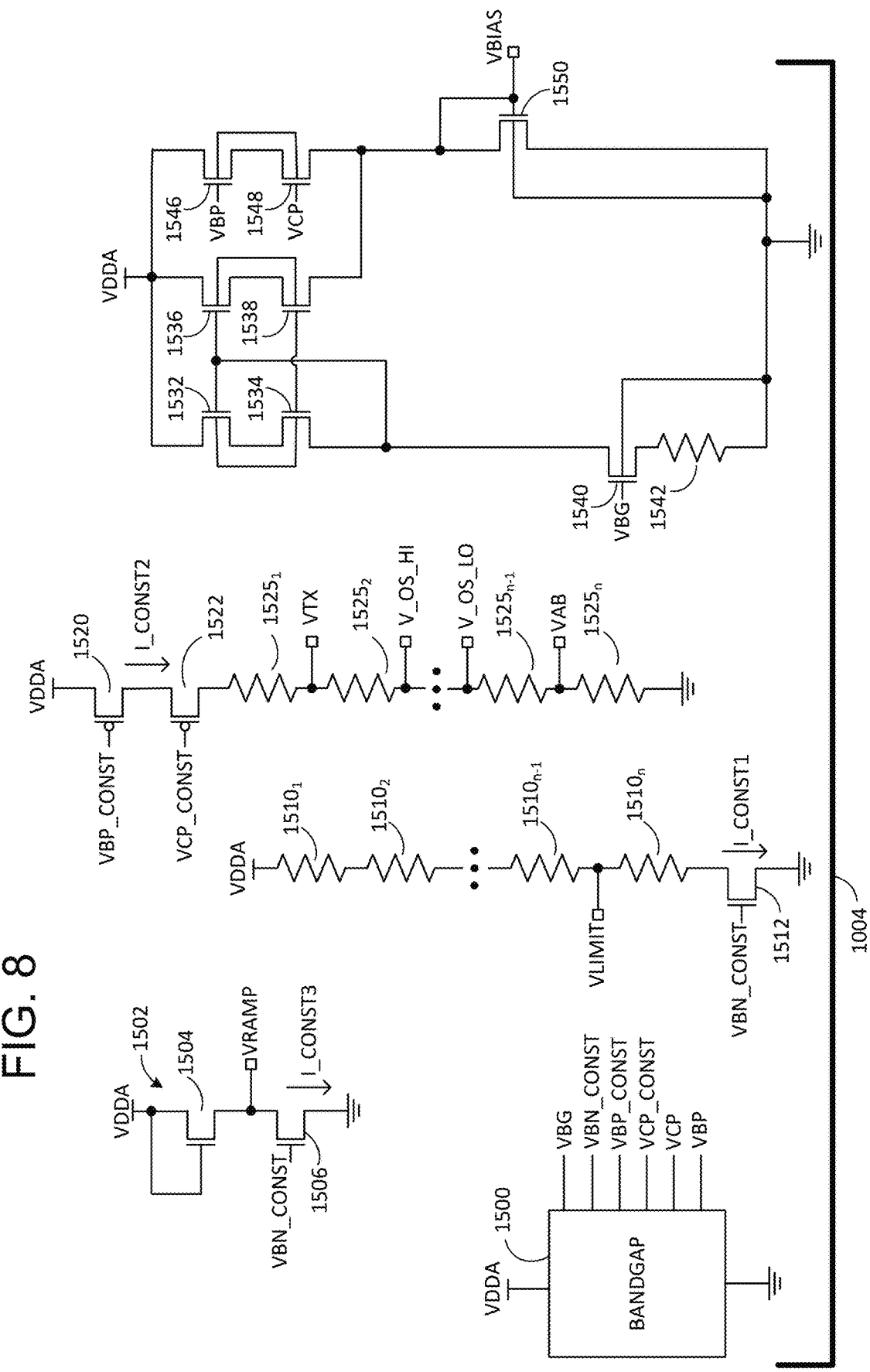
FIG. 8 is an electrical circuit diagram in block and schematic form of a bandgap voltage reference block that may be used in the light-to-pulse circuit shown in FIG. 6.

FIG. 8 shows an example of portions of a circuit that may be used as bandgap voltage reference block 1004. In general, the circuit uses bandgap-derived bias voltages to generate constant currents. The constant currents are fed through resistive ladders to generate voltages. Supply-independent voltages, such as VTX, VAB, V_OS_HI, V_OS_LO, and VBIAS, are referenced to ground through a PMOS ladder. Supply-dependent voltages such as VLIMIT may be referenced to VDDA through a resistive ladder. The reference VRAMP may be generated by passing VDDA through a source follower similar to the source followers 1434 and 1436 used to read the outputs of photodiodes 1430 and 1432.

Looking more specifically at FIG. 8, bandgap voltage reference circuit 1004 may include a bandgap circuit 1500 providing bandgap-derived bias voltages VBG, VSP, VBP, VBN_CONST, VBP_CONST, and VCP_CONST to various branches of the bandgap voltage reference circuit 1004. In the portion of bandgap voltage reference circuit 1004 that is illustrated, four branches are shown in which a first branch is used to derive VRAMP, a second branch is used to derive VLIMIT, a third branch is used to derive VTX, VAB, V_OS_HI, and V_OS_LO, and a fourth branch is used to generate VBIAS.

The first branch includes a source follower 1502 having a first transistor 1504 whose source is connected to VDDA and also to its gate. The source follower 1502 further includes a second transistor 1506 having a source connected to the drain of first transistor 1504, a gate connected to receive VBN_CONST from bandgap circuit 1500, and a drain coupled to ground. The source follower 1502 generates a constant current I_CONST3 and a tap between transistors 1504 and 1506 supplies the reference voltage VRAMP, which is provided from bandgap voltage reference circuit 1004 to switch 1330 in FIG. 6.

The second branch includes a resistor ladder having a plurality of resistors $1510_1$-$1510_n$ connected in series between VDDA and a source of a transistor 1512, which has a drain coupled to ground and a gate coupled to bandgap circuit 1500 to receive voltage VBN_CONST. This second branch produces a constant current I_CONST1 such that a tap between the resistors supplies the reference voltage VLIMIT, which is provided from bandgap voltage reference circuit 1004 to an input of comparator 1438 in FIG. 6. As noted above, VLIMIT is a supply-dependent voltage. VLIMIT is selected to correspond to the voltage of the highest integrated charge one would ever expect to see from the photodiode 1430 shown in FIG. 6.

The third branch provides supply-independent voltages and includes a first PMOS transistor 1520 having a source connected to VDDA and a gate connected to bandgap circuit 1500 to receive voltage VBP_CONST, and a second PMOS transistor 1522 having a source coupled to a drain of first PMOS transistor 1522, a gate connected to bandgap circuit 1500 to receive voltage VCP_CONST, and a drain connected to a resistor ladder including a plurality of resistors $1525_1$-$1525_n$ connected in series between the drain of second PMOS transistor 1522 and ground. The third branch produces a constant current I_CONST1 that passes through the resistor ladder. A plurality of taps is provided at different points between the resistors to supply: the reference voltage VTX, which is provided from bandgap voltage reference circuit 1004 to switches 1010 and 1012 in FIG. 6; the reference voltage VAB, which is provided from bandgap voltage reference circuit 1004 to switches 1006 and 1008; and the reference voltages V_OS_HI and V_OS_LO, which are provided from bandgap voltage reference circuit 1004 to one shot logic circuit in FIGS. 6 and 7.

The fourth branch includes a first transistor 1532, a second transistor 1534, a third transistor 1536, a fourth transistor 1538, a fifth transistor 1540, a sixth transistor 1546, a seventh transistor 1548, an eighth transistor 1550, and a resistor 1542. First transistor 1532 and third transistor 1536 both have their sources coupled to VDDA, their gates coupled together, and their drains coupled to the sources of second transistor 1534 and fourth transistor 1538, respectively. The gates of second transistor 1534 and fourth transistor 1538 are coupled together. The drain of second transistor 1534 is coupled to the gates of first transistor 1532 and third transistor 1536, and is also coupled to the source of fifth transistor 1540. The gate of fifth transistor 1540 is coupled to bandgap circuit 1500 so as to receive voltage VBG. The drain of fifth transistor 1540 is coupled to ground via resistor 1542. Sixth transistor 1546 has a source coupled to VDDA, a gate coupled to bandgap circuit 1500 so as to receive voltage VBP, and a drain coupled to the source of seventh transistor 1548. Seventh transistor 1548 has a gate coupled to bandgap circuit 1500 so as to receive voltage VCP, and a drain coupled to both the source and the gate of eighth transistor 1550. Also coupled to the source and the gate of eighth transistor 1550 is the drain of fourth transistor 1538. The drain of eighth transistor 1550 is coupled to ground. The fourth branch includes a tap between the drain of seventh transistor 1548 and the source of eighth transistor 1550 that supplies the reference voltage VBIAS, which is provided from bandgap voltage reference circuit 1004 to a gate of transistor 1030 in FIG. 6. The current flowing through the sixth through eighth transistors is temperature independent.

The actual packaging of the light sensors described above may take any of the forms described in U.S. Pat. No. 7,543,946, the entire disclosure of which is incorporated herein by reference.

Figure 9:
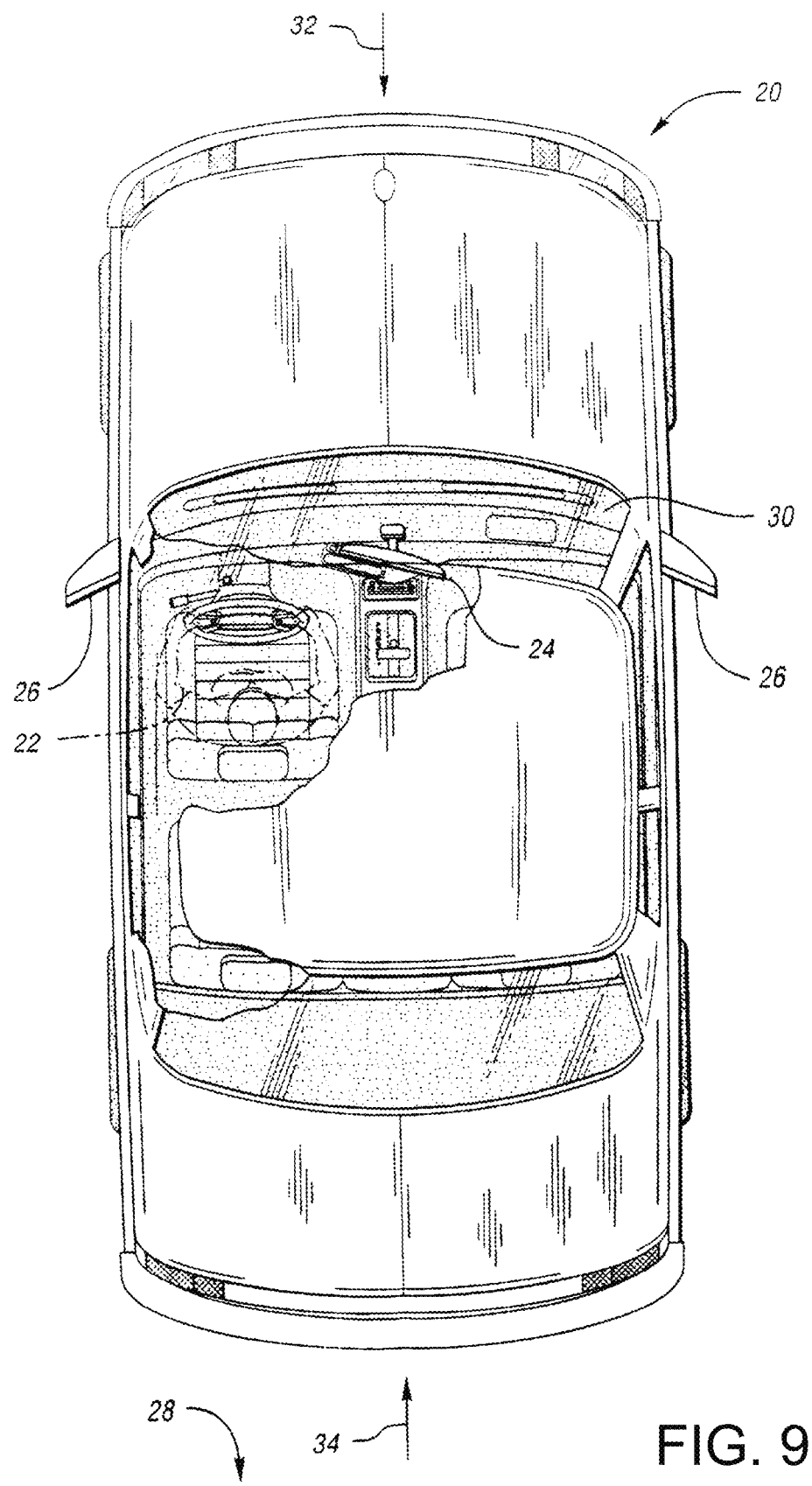
FIG. 9 is a drawing illustrating vehicle rearview mirrors that may incorporate the light sensors of the present invention.

Referring now to FIG. 9, a drawing illustrating vehicle rearview mirrors that may incorporate the light sensor of the present invention is shown. A vehicle 20 is driven by an operator 22. Operator 22 uses an interior rearview mirror 24 and one or more exterior rearview mirrors 26 to view a rearward scene, shown generally by 28. Most of the time, operator 22 is looking forward through a windshield 30. The eyes of operator 22 therefore adjust to ambient light 32 coming from a generally forward direction. A relatively bright light source in rearward scene 28 may produce light which can reflect from mirrors 24, 26 to temporarily visually impair, distract, or dazzle operator 22. This relatively strong light is known as glare 34.

To reduce the impact of glare 34 on operator 22, the reflectance of mirrors 24, 26 may be reduced. Prior to automatically dimming mirrors, interior rearview mirror 24 would contain a prismatic reflective element that could be manually switched by operator 22. Automatically dimming mirrors include a light sensor for glare 34 and, typically, for ambient light 32, and dim one or more mirrors 24, 26 in response to the level of glare 34.

Figure 10:
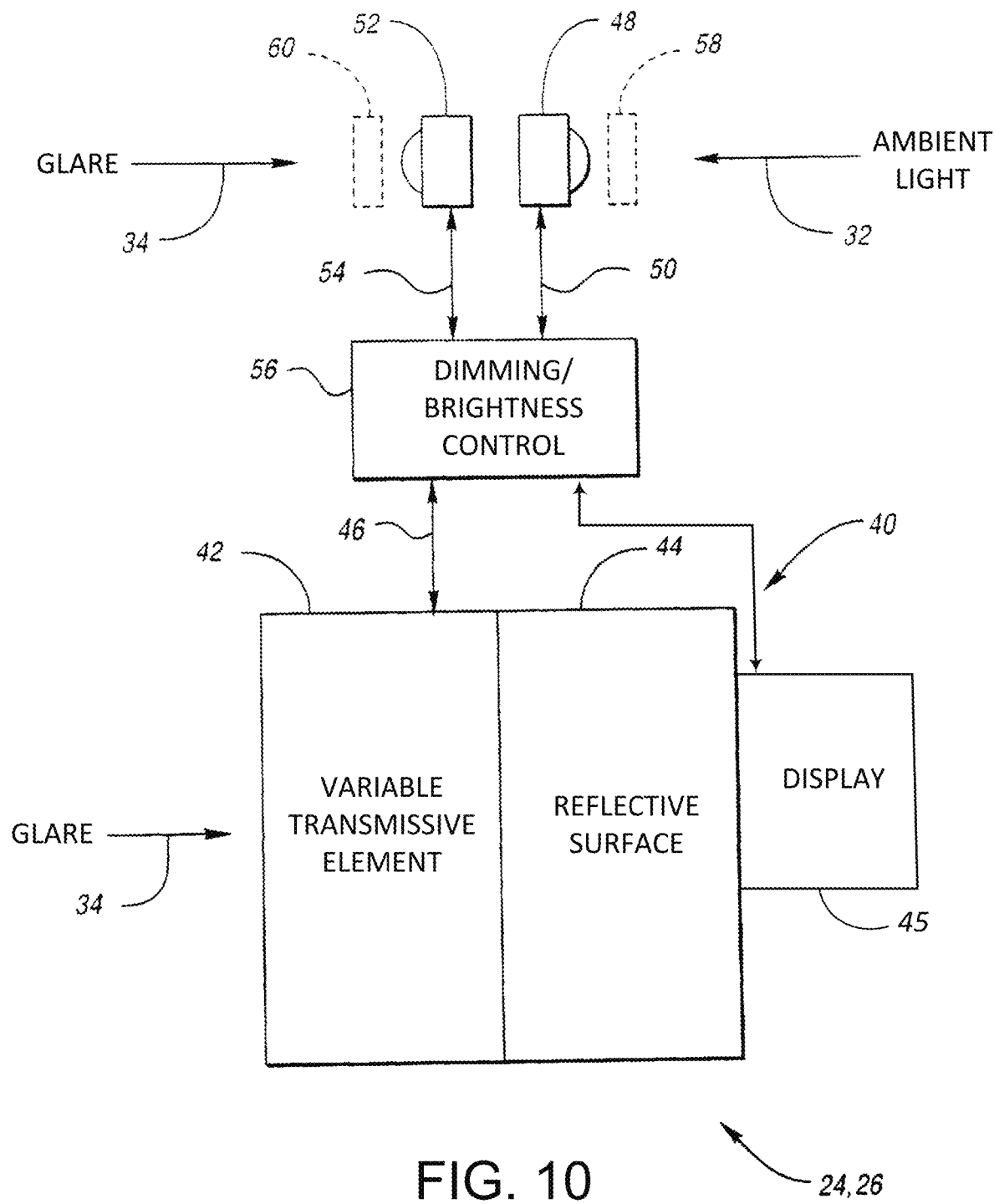
FIG. 10 is a block diagram of an embodiment using the light sensors of the present invention.

Referring now to FIG. 10, a block diagram of an embodiment of the present invention is shown. A dimming element, shown generally by 40, includes a variable transmittance element 42 and a reflective surface 44. Dimming element 40 is positioned such that reflective surface 44 is viewed through variable transmittance element 42. Dimming element 40 exhibits variable reflectance of light in response to a dimming element control signal 46. An ambient light sensor 48 is positioned to receive ambient light 32 from generally in front of vehicle 20. Ambient light sensor 48 produces a discrete ambient light signal 50 indicating the amount of ambient light 32 incident on ambient light sensor 48 over an ambient light integration period. A glare sensor 52 is positioned to detect glare 34 from generally behind vehicle 20 and may optionally be placed to view glare 34 through variable transmittance element 42. Glare sensor 52 produces a discrete glare signal 54 indicating the amount of glare 34 incident on glare sensor 52 over a glare integration period. Dimming/brightness control logic 56 receives ambient light signal 50 and determines an ambient light level. Dimming/brightness control logic 56 determines the glare integration period based on the level of ambient light 32. Dimming/brightness control logic 56 receives glare signal 54 and determines the level of glare 34. Dimming logic 56 outputs dimming element control signal 46, setting the reflectance of dimming element 40 to reduce the effects of glare 34 perceived by operator 22.

Either glare sensor 52, ambient light sensor 48 or both are sensors that include light transducers which convert incident light into charge. This charge is collected over an integration period to produce a potential which is converted by sensor 48, 52 into a discrete output. Embodiments for light sensors 48, 52 are described with regard to FIGS. 6-8 above.

One difficulty with silicon-based sensors is the difference in spectral sensitivity between silicon and the human eye. An ambient light filter 58 may be placed before or incorporated within ambient light sensor 48. Similarly, a glare filter 60 may be placed before or incorporated within glare sensor 52. Filters 58, 60 attenuate certain portions of the spectrum that may include visible light, infrared, and ultraviolet radiation such that light sensors 48, 52 combine with the frequency response of light transducers within sensors 48, 52 to more closely approximate the response of the human eye and to compensate for tinting in vehicle windows such as windshield 30. Alternatively, filters 58, 60 may attenuate light across the visible spectrum as discussed further below.

Variable transmittance element 42 may be implemented using a variety of devices. Dimming may be accomplished mechanically as described in U.S. Pat. No. 3,680,951 entitled "Photoelectrically-Controlled Rear-View Mirror" to Jordan et al., and U.S. Pat. No. 4,443,057 entitled "Automatic Rearview Mirror For Automotive Vehicles" to Bauer et al., each of which is incorporated herein by reference. Variable transmittance element 42 may be formed using liquid crystal cells as is described in U.S. Pat. No. 4,632,509 entitled "Glare-Shielding Type Reflector" to Ohmi et al., which is incorporated herein by reference. Preferably, variable transmittance element 42 is an electrochromic cell which varies its transmittance in response to an applied control voltage such as is described in U.S. Pat. No. 4,902,108 entitled "Single-Compartment, Self-Erasing, Solution-Phase Electrochromic Devices, Solutions For Use Therein, And Uses Thereof" to Byker, which is incorporated herein by reference. Many other electrochromic devices may be used to implement dimming element 40. As will be recognized by one of ordinary skill in the art, the present invention does not depend on the type or construction of dimming element 40. If dimming element 40 includes electrochromic variable transmittance element 42, reflective surface 44 may be incorporated into variable transmittance element 42 or may be external to variable transmittance element 42.

Each interior rearview mirror 24 and exterior rearview mirror 26 may include dimming element 40 for automatic dimming. Interior rearview mirror 24 may also include dimming/brightness control logic 56, light sensors 48, 52, and, if used, filters 58 and 60. Additionally, interior rearview mirror 24 may include a display, which may be positioned adjacent to or behind the reflective surface 44 of mirror element 40. Dimming/brightness control 56 can also be responsive to the outputs of ambient sensor 48 and/or glare sensor 52 to control the brightness of the display.

The light sensors described herein may be implemented in various ways as disclosed in U.S. Pat. No. 7,543,946, U.S. Patent Application Publication Nos. US 2012/0330504 A1 and US 2013/0032704 A1, the entire disclosures of which are incorporated herein by reference.

Figure 12:
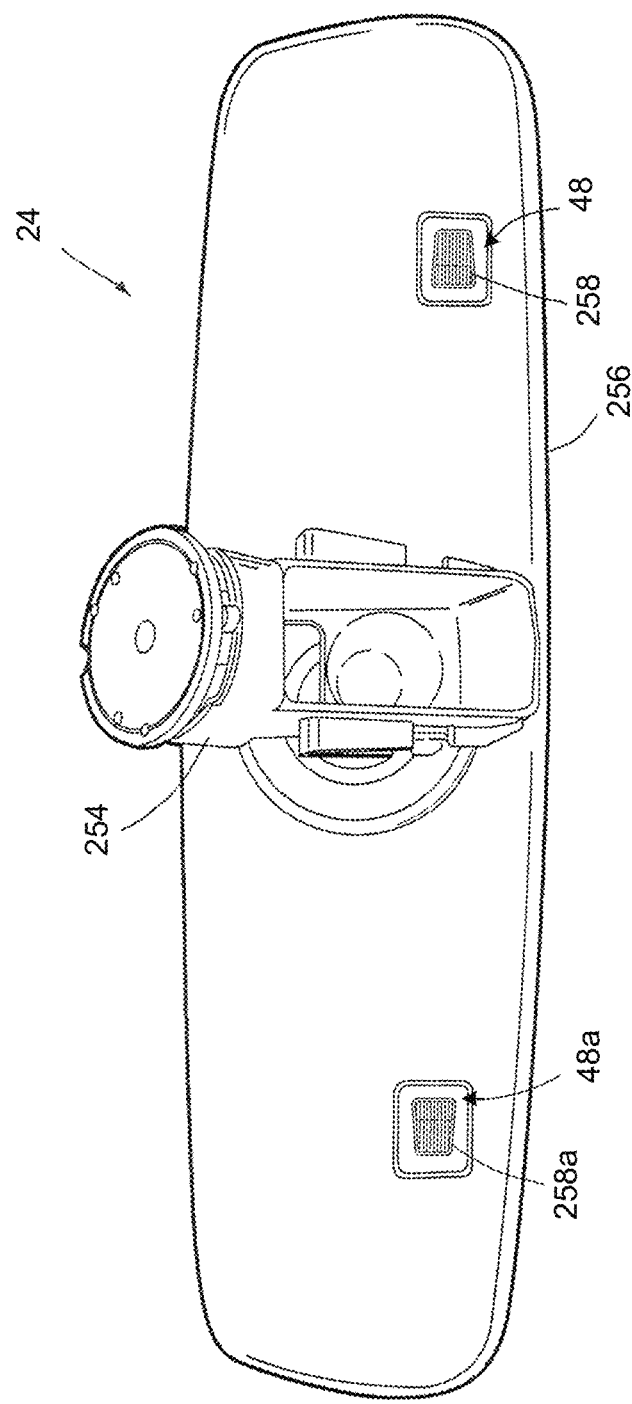
FIG. 12 is a rear perspective view of a rearview assembly incorporating at least one of the light sensors described herein.
Figure 13:
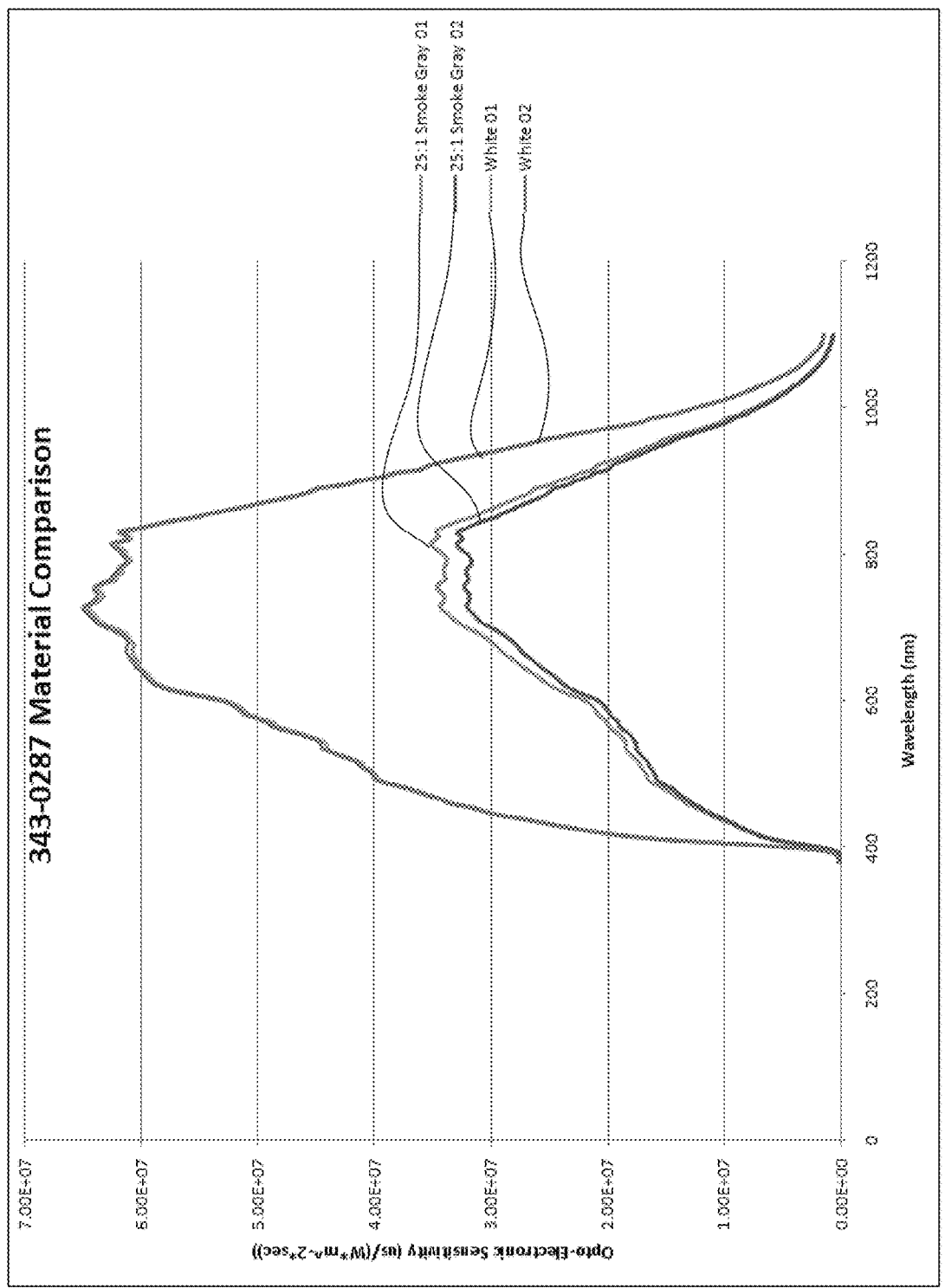
FIG. 13 is a plot of opto-electric sensitivity versus wavelength of four light sensors.

FIG. 12 shows the back of a rearview mirror assembly 24 having a mirror mount 254, a housing 256, and one or more ambient light sensors 48, 48a including a secondary optic 258, 258a. The secondary optic may incorporate a filter 58 in the form of a tinting material. The tinting material may be a pigment that is neutral in color, such as a gray color so as to attenuate the amount of light reaching the sensing element. Such a tinted secondary optic 258 beneficially attenuates light uniformly across the visible spectrum since the light sensor described herein is much more sensitive to low light levels than prior light sensors. Such increased spectral sensitivity may cause the light sensor to otherwise be overly sensitive to high light levels. FIG. 13 shows the attenuation levels of providing a smoke gray tint filter in front of the light sensing element versus light sensors with no such filters. The smoke gray tint filter is considered to be spectrally neutral.

Another advantage to providing such dark tinting in the outermost secondary optic 258 is that it improves the ascetics of the mirror assembly as many mirror housings 256 are black or gray. Prior secondary optics often included a white diffusant material which made the sensor(s) appear to be bright white and thereby have a very high contrast relative to the black or gray mirror housings. By darkening secondary optic 258, the light sensor becomes less visible and blends in with the housing 256.

Although not shown in FIG. 12, the gray tinting may also be used in a secondary optic used for a glare light sensor 52 or may be used in other light sensors in the rearview mirror or in the vehicle.

Figure 11:
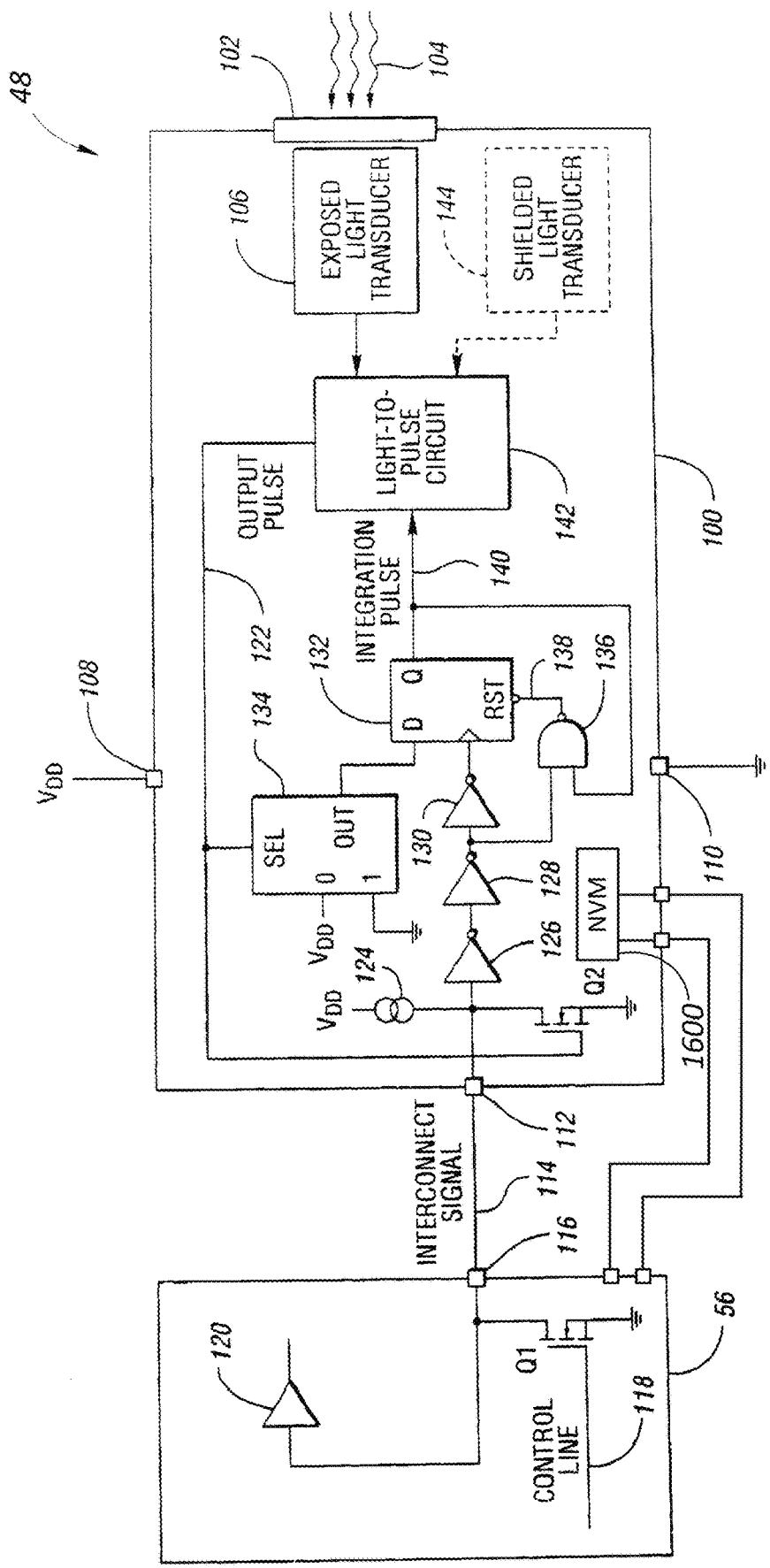
FIG. 11 is an electrical circuit diagram in block and schematic form of an alternative light sensor package in which embodiments of the inventive light-to-pulse circuit may be implemented.

Due to manufacturing variances, most light sensors respond to light differently. To get each mirror to respond to light in the same way, each mirror may be calibrated. Currently, this is done in testers after circuit board assembly. The light sensor component in the mirror assembly is exposed to specific amounts of light and a compensation factor is written into the control circuitry within the mirror assembly. Such a manner of calibration is not particularly desirable as it is more desirable to calibrate each individual light sensor before it is populated onto the circuit board. One way to get around this is to have the calibration factor of each light sensor component be part of that individual light sensor. By incorporating a nonvolatile memory (NVM) device 1600 into each light sensor component, as shown in FIG. 11, the calibration factors for the given light sensor, such as offset and integration times, can be written into the memory 1600 during the initial testing of the light sensor in component testing. These calibration factors can then be read and written into the mirror control circuit after the light sensor component is assembled into the mirror eliminating the current calibration processes.

Another way to accomplish this would be to have a serial number written to the memory 1600 and the calibrations for the individual light sensor component written into network storage. After the light sensor component is assembled into the mirror, the serial number could be read and the corresponding compensation factors downloaded from the network into the mirror control circuit.

The memory 1600 could be an individual die and may not have any direct functional connection with the light sensor die. The light sensor will function as normal as if the memory die were left out of the assembly.

Although not currently claimed, the following text is provided to form the basis for future claims:

A1. A light sensor package comprising:
an enclosure having a window for receiving light, the enclosure admitting at least a power connection pad, a ground connection pad, and an input/output pad;
a capacitor provided at the input/output pad and connected between the input/output pad and ground for blocking static electricity;
an exposed light transducer disposed within the enclosure, the exposed light transducer operative to accumulate charge in proportion to light received through the window incident on the exposed light transducer over an integration period; and
a light-to-pulse circuit in communication with the exposed light transducer, the light-to-pulse circuit operative to output a pulse on the output pin, the pulse width based on the charge accumulated by the exposed light transducer.

A2. The light sensor package of claim A1, wherein the capacitor is part of an input low pass filter provided at the input/output pad for blocking electromagnetic interference.

A3. The light sensor package of claim A1, wherein the capacitor is configured such that the light sensor package is rated for at least 2 kV static protection.

A4. The light sensor package of claim A1 and further comprising a bandgap reference circuit for receiving power from a power source having a supply voltage level in a range of about 3.3V to about 5.0V, and for generating a set of stable reference voltages throughout the supply voltage level range to the light-to-pulse circuit.

A5. The light sensor package of claim A1 and further comprising a bandgap voltage reference circuit for receiving power from a power source and for generating a set of stable reference voltages to the light-to-pulse circuit, wherein the bandgap voltage reference circuit generates constant currents from the supply voltage supplied by the power supply and wherein the bandgap voltage reference circuit comprises resistive ladders through which the constant currents are passed to generate the set of stable reference voltages.

A6. A rearview assembly for a vehicle comprising:
a rearview device for providing a rearward view to a driver of the vehicle;
the light sensor package of claim A1; and
a mounting mechanism adapted for mounting the rearview device and the light sensor package to the vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A rearview assembly for a vehicle comprising:
a housing configured for mounting to the vehicle;
a rearview element disposed in said housing that presents images of a scene rearward of the vehicle;
a light sensor assembly disposed in said housing, said light sensor assembly comprising:
a light sensor for outputting an electrical signal representing intensity of light impinging upon a light-receiving surface of the light sensor, and
a secondary optical element configured to receive light, wherein the light passes through said secondary optical element to said light sensor, said secondary optical element including a tint material that is substantially color neutral for attenuating light passing therethrough; and
a controller for receiving the electrical signal of said light sensor and for adjusting a brightness of the images presented by said rearview element.

2. The rearview assembly of claim 1, wherein said rearview element includes a display positioned in said housing, wherein the controller adjusts the brightness of the images presented by said rearview element by adjusting the brightness of said display.

3. The rearview assembly of claim 1, wherein said rearview element includes an electro-optic mirror element having a reflectance that is adjustable, wherein the controller adjusts the brightness of the images presented by said rearview element by adjusting the reflectance of said electro-optic mirror element.

4. The rearview assembly of claim 3, wherein said rearview element includes a display positioned in said housing, wherein the controller adjusts the brightness of the images presented by said rearview element by further adjusting the brightness of said display.

5. The rearview assembly of claim 1, wherein said light sensor comprises an input/output pad and a capacitor provided at the input/output pad and connected between the input/output pad and ground for blocking static electricity.

6. The rearview assembly of claim 1, wherein said light sensor comprises an input/output pad and an input low pass filter provided at an input side of the input/output pad for blocking electromagnetic interference.

7. The rearview assembly of claim 1, wherein said light sensor comprises:
an exposed light transducer operative to accumulate charge in proportion to light incident on the exposed light transducer over an integration period;
a light-to-pulse circuit in communication with the exposed light transducer, the light-to-pulse circuit operative to output a pulse having a pulse width based on the charge accumulated by the exposed light transducer; and
a bandgap reference circuit for receiving power from a power source having a supply voltage level in a range of about 3.3V to about 5.0V, and for generating a set of stable reference voltages throughout the supply voltage level range to the light-to-pulse circuit.

8. The rearview assembly of claim 1, wherein said light sensor comprises a bandgap voltage reference circuit for receiving power from a power source and for generating a set of stable reference voltages to the light-to-pulse circuit, wherein the bandgap voltage reference circuit generates constant currents from the supply voltage supplied by the power supply and wherein the bandgap voltage reference circuit comprises resistive ladders through which the constant currents are passed to generate the set of stable reference voltages.

9. The rearview assembly of claim 1, wherein said light sensor comprises:
an exposed light transducer operative to accumulate charge in proportion to light incident on the exposed light transducer over an integration period;
a shielded light transducer shielded from light, the shielded light transducer having substantially the same construction as the exposed light transducer, the shielded light transducer operative to accumulate charge in proportion to noise over the integration period; and
a light-to-pulse circuit in communication with the exposed light transducer and the shielded light transducer, the light-to-pulse circuit operative to output a pulse having a pulse width based on the difference between the charges accumulated by the exposed and shielded light transducers, wherein the light-to-pulse circuit includes a one shot logic circuit that contributes to a generation of the pulse.

10. The rearview assembly of claim 1, wherein said light sensor comprises:
an enclosure having a window for receiving light, the enclosure admitting at least a power connection pad, a ground connection pad, and an input/output pad;
an exposed light transducer disposed within the enclosure, the exposed light transducer operative to accumulate charge in proportion to light received through the window incident on the exposed light transducer over an integration period;
a light-to-pulse circuit in communication with the exposed light transducer, the light-to-pulse circuit operative to output a pulse on the output pin, the pulse width based on the charge accumulated by the exposed light transducer over the integration period; and
a nonvolatile memory within the enclosure for storing data from which calibration data may be obtained for the light sensor.

11. A display assembly for a vehicle comprising:
a housing configured for mounting to the vehicle;
a display element disposed in said housing that displays images of a scene exterior of the vehicle;
a light sensor assembly disposed in said housing, said light sensor assembly comprising:
a light sensor for outputting an electrical signal representing intensity of light impinging upon a light-receiving surface of the light sensor, and
a secondary optical element configured to receive light, wherein the light passes through said secondary optical element to said light sensor, said secondary optical element including a tint material that is substantially color neutral for attenuating light passing therethrough; and
a controller for receiving the electrical signal of said light sensor and for adjusting a brightness of the images displayed by said display element.

12. The display assembly of claim 11, wherein said light sensor comprises:
an exposed light transducer operative to accumulate charge in proportion to light incident on the exposed light transducer over an integration period;
a light-to-pulse circuit in communication with the exposed light transducer, the light-to-pulse circuit operative to output a pulse having a pulse width based on the charge accumulated by the exposed light transducer; and
a bandgap reference circuit for receiving power from a power source having a supply voltage level in a range of about 3.3V to about 5.0V, and for generating a set of stable reference voltages throughout the supply voltage level range to the light-to-pulse circuit.

13. The display assembly of claim 11, wherein said light sensor comprises a bandgap voltage reference circuit for receiving power from a power source and for generating a set of stable reference voltages to the light-to-pulse circuit, wherein the bandgap voltage reference circuit generates constant currents from the supply voltage supplied by the power supply and wherein the bandgap voltage reference circuit comprises resistive ladders through which the constant currents are passed to generate the set of stable reference voltages.

14. The display assembly of claim 11, wherein said light sensor comprises:
an exposed light transducer operative to accumulate charge in proportion to light incident on the exposed light transducer over an integration period;
a shielded light transducer shielded from light, the shielded light transducer having substantially the same construction as the exposed light transducer, the shielded light transducer operative to accumulate charge in proportion to noise over the integration period; and
a light-to-pulse circuit in communication with the exposed light transducer and the shielded light transducer, the light-to-pulse circuit operative to output a pulse having a pulse width based on the difference between the charges accumulated by the exposed and shielded light transducers, wherein the light-to-pulse circuit includes a one shot logic circuit that contributes to a generation of the pulse.

15. The display assembly of claim 11, wherein said light sensor comprises:
an enclosure having a window for receiving light, the enclosure admitting at least a power connection pad, a ground connection pad, and an input/output pad;
an exposed light transducer disposed within the enclosure, the exposed light transducer operative to accumulate charge in proportion to light received through the window incident on the exposed light transducer over an integration period;

a light-to-pulse circuit in communication with the exposed light transducer, the light-to-pulse circuit operative to output a pulse on the output pin, the pulse width based on the charge accumulated by the exposed light transducer over the integration period; and a nonvolatile memory within the enclosure for storing data from which calibration data may be obtained for the light sensor.

* * * * *

UNITED STATES PATENT AND TRADEMARK OFFICE
CERTIFICATE OF CORRECTION

PATENT NO. : 11,017,741 B2
APPLICATION NO. : 15/869556
DATED : May 25, 2021
INVENTOR(S) : Barry K. Nelson et al.

Page 1 of 1

It is certified that error appears in the above-identified patent and that said Letters Patent is hereby corrected as shown below:

In the Claims

Column 17, Line 60, "pin" should be --pad--;

Column 19, Line 6, "pin" should be --pad--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*